United States Patent
Weber

(10) Patent No.: US 11,131,567 B2
(45) Date of Patent: Sep. 28, 2021

(54) SYSTEMS AND METHODS FOR ERROR DETECTION IN CRANKSHAFT TOOTH ENCODING

(71) Applicant: Honda Motor Co., Ltd., Tokyo (JP)

(72) Inventor: Philip R. Weber, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 16/657,134

(22) Filed: Oct. 18, 2019

(65) Prior Publication Data
US 2020/0256709 A1     Aug. 13, 2020

Related U.S. Application Data

(63) Continuation-in-part of application No. 16/271,087, filed on Feb. 8, 2019.

(51) Int. Cl.
*G01D 5/24*     (2006.01)
*G01D 5/244*    (2006.01)
(Continued)

(52) U.S. Cl.
CPC .......... *G01D 5/24471* (2013.01); *F01L 33/02* (2013.01); *G01M 15/06* (2013.01); *F01L 2820/042* (2013.01)

(58) Field of Classification Search
CPC ........... G01D 5/24471; G01D 5/24466; G01D 5/24461; G01D 5/24495; F01L 33/02;
(Continued)

(56) References Cited

U.S. PATENT DOCUMENTS 3,979,161 A   9/1976   Kremer et al.
4,116,175 A   9/1978   Sand
(Continued)

FOREIGN PATENT DOCUMENTS

CN   203223516 U   10/2013
CN   203780034 U   8/2014
(Continued)

OTHER PUBLICATIONS

Office Action of U.S. Appl. No. 16/271,087 dated Mar. 30, 2021, 28 pages.
(Continued)

*Primary Examiner* — Joseph J Dallo
(74) *Attorney, Agent, or Firm* — Rankin Hill & Clark LLP

(57) ABSTRACT

Embodiments, systems, and methods for error detection in crankshaft tooth encoding for a crank pulse wheel of a vehicle are provided. In some embodiments, a system for crankshaft tooth encoding includes a read module, a buffer module, an error module, and a position module. The read module identifies a tooth type for N number of teeth in a sliding buffer based on at least one tooth characteristic. The buffer module calculates a buffer value for the sliding buffer corresponding to a tooth represented in the sliding buffer. The error module detects an error associated with a tooth of the crank pulse wheel and calculates a revised buffer value based on the error. The position module determines an angular position of the crank pulse wheel based on the revised buffer value. The position module broadcasts the angular position to one or more vehicle systems of the vehicle.

20 Claims, 16 Drawing Sheets

(51) Int. Cl.
*F01L 33/02* (2006.01)
*G01M 15/06* (2006.01)

(58) Field of Classification Search
CPC ... F01L 2820/042; G01M 15/06; Y02T 10/40; F02D 41/222; F02D 41/0097; G06K 9/6268; G06K 9/3233; G06K 9/4671; G01B 21/22
See application file for complete search history.

(56) References Cited

U.S. PATENT DOCUMENTS

| | | | |
|---|---|---|---|
| 4,121,112 A | 10/1978 | Hartig | |
| 4,138,976 A | 2/1979 | Crall | |
| 4,518,918 A | 5/1985 | Avery | |
| 4,528,471 A | 7/1985 | Baumann | |
| 4,535,289 A | 8/1985 | Abe et al. | |
| 4,827,800 A * | 5/1989 | Pedersen | F01C 21/008 |
| | | | 403/359.6 |
| 4,935,698 A | 6/1990 | Kawaji et al. | |
| 5,070,727 A | 12/1991 | David et al. | |
| 5,084,674 A | 1/1992 | Lachmann et al. | |
| 5,182,943 A | 2/1993 | Fukui et al. | |
| 5,444,370 A | 8/1995 | Wu | |
| 5,623,412 A | 4/1997 | Masson et al. | |
| 5,694,040 A | 12/1997 | Plagens | |
| 5,794,171 A | 8/1998 | Bryant et al. | |
| 5,856,922 A * | 1/1999 | Jehanno | G01L 3/00 |
| | | | 701/108 |
| 5,870,688 A * | 2/1999 | Kanbara | F02D 41/1498 |
| | | | 701/110 |
| 6,012,551 A | 1/2000 | Raab | |
| 6,062,071 A * | 5/2000 | Henn | G01P 3/4802 |
| | | | 73/114.04 |
| 6,175,233 B1 | 1/2001 | McCurley et al. | |
| 6,199,426 B1 * | 3/2001 | Shibagaki | G01M 15/11 |
| | | | 73/114.04 |
| 6,341,253 B1 | 1/2002 | Honda | |
| 6,346,808 B1 | 2/2002 | Schroeder | |
| 6,404,188 B1 | 6/2002 | Ricks | |
| 6,474,278 B1 | 11/2002 | Davis et al. | |
| 6,490,914 B1 * | 12/2002 | Brandenburg | F02N 15/006 |
| | | | 73/114.26 |
| 6,566,867 B1 | 5/2003 | Schroeder et al. | |
| 6,609,498 B2 | 8/2003 | Mathews et al. | |
| 6,737,861 B2 | 5/2004 | Lantto | |
| 6,752,009 B2 | 6/2004 | Minich et al. | |
| 6,978,666 B1 * | 12/2005 | Wu | G01M 15/11 |
| | | | 73/114.02 |
| 7,069,774 B2 | 7/2006 | Nakamura et al. | |
| 7,096,593 B2 | 8/2006 | Schmied | |
| 7,116,096 B2 | 10/2006 | Waszkowski et al. | |
| 7,135,856 B2 | 11/2006 | Eidenvall et al. | |
| 7,167,793 B1 | 1/2007 | Gibson et al. | |
| 7,458,164 B2 | 12/2008 | Perret et al. | |
| 7,942,041 B2 | 5/2011 | Takeuchi | |
| 8,085,036 B2 | 12/2011 | Ausserlechner | |
| 8,120,351 B2 | 2/2012 | Rettig et al. | |
| 8,978,453 B2 | 3/2015 | Fayyad et al. | |
| 9,297,321 B2 | 3/2016 | Hawken et al. | |
| 9,297,346 B2 | 3/2016 | Wang | |
| 9,303,972 B2 | 4/2016 | Oberhauser et al. | |
| 9,465,087 B2 | 10/2016 | Klotzbuecher et al. | |
| 9,568,310 B2 | 2/2017 | Stuckert et al. | |
| 9,765,711 B2 | 9/2017 | Martinson | |
| 9,938,921 B2 | 4/2018 | Hagari et al. | |
| 10,036,653 B2 | 7/2018 | Hernandez-Oliver | |
| 10,184,860 B2 | 1/2019 | Schweikert et al. | |
| 10,234,513 B2 | 3/2019 | Vig et al. | |
| 10,254,103 B2 | 4/2019 | Taylor et al. | |
| 10,260,906 B2 | 4/2019 | Liu et al. | |
| 10,428,752 B2 | 10/2019 | Mazenc et al. | |
| 2002/0093202 A1 | 7/2002 | Downs et al. | |
| 2003/0168044 A1 * | 9/2003 | Rupp | F02D 41/009 |
| | | | 123/406.18 |
| 2004/0020472 A1 | 2/2004 | Bayerle et al. | |
| 2005/0061293 A1 | 3/2005 | Chung et al. | |
| 2005/0285592 A1 | 12/2005 | Taniguchi et al. | |
| 2006/0089784 A1 | 4/2006 | Spicer et al. | |
| 2006/0150938 A1 * | 7/2006 | Kramer | F02D 41/062 |
| | | | 123/179.5 |
| 2007/0068015 A1 | 3/2007 | Perret et al. | |
| 2007/0170913 A1 | 7/2007 | Yokotani et al. | |
| 2008/0022760 A1 | 1/2008 | McDaniel et al. | |
| 2008/0027622 A1 | 1/2008 | McDaniel | |
| 2008/0125929 A1 | 5/2008 | Prokhorov | |
| 2008/0173079 A1 | 7/2008 | McGee et al. | |
| 2009/0276143 A1 * | 11/2009 | Rackmil, I | F02D 41/0097 |
| | | | 701/103 |
| 2009/0301179 A1 | 12/2009 | Moessner | |
| 2010/0072988 A1 | 3/2010 | Hammerschmidt et al. | |
| 2010/0107747 A1 | 5/2010 | Rolew et al. | |
| 2011/0048350 A1 | 3/2011 | Simpson et al. | |
| 2011/0213545 A1 | 9/2011 | Oaten et al. | |
| 2012/0271536 A1 * | 10/2012 | Hamedovic | F02D 35/028 |
| | | | 701/111 |
| 2013/0073182 A1 * | 3/2013 | Lindsay | F02D 19/0644 |
| | | | 701/103 |
| 2013/0082693 A1 | 4/2013 | Boehl | |
| 2013/0096872 A1 | 4/2013 | Boehl | |
| 2013/0151194 A1 | 6/2013 | Hawken et al. | |
| 2013/0180505 A1 | 7/2013 | Schüle et al. | |
| 2014/0019084 A1 * | 1/2014 | Rolew | G01B 7/14 |
| | | | 702/150 |
| 2014/0060486 A1 | 3/2014 | Maezawa | |
| 2014/0084926 A1 | 3/2014 | Ruigrok et al. | |
| 2014/0107904 A1 | 4/2014 | Nefzer et al. | |
| 2014/0232379 A1 | 8/2014 | Nazarian et al. | |
| 2015/0354479 A1 * | 12/2015 | Lindsay | F02D 41/009 |
| | | | 123/480 |
| 2015/0369195 A1 | 12/2015 | Wang | |
| 2017/0102291 A1 | 4/2017 | Gladel et al. | |
| 2017/0138281 A1 | 5/2017 | Utley et al. | |
| 2017/0217427 A1 | 8/2017 | Weiß et al. | |
| 2017/0276740 A1 | 9/2017 | Schmitt et al. | |
| 2017/0292898 A1 | 10/2017 | Schweikert et al. | |
| 2017/0299467 A1 | 10/2017 | Johansson et al. | |
| 2017/0363512 A1 | 12/2017 | Ognibene | |
| 2018/0195453 A1 | 7/2018 | Zhang | |
| 2018/0230865 A1 * | 8/2018 | Brown | H02K 29/08 |
| 2018/0298836 A1 * | 10/2018 | Stowasser | F02D 41/064 |
| 2018/0355815 A1 | 12/2018 | Braun et al. | |
| 2019/0086236 A1 | 3/2019 | Binder et al. | |
| 2019/0301897 A1 | 10/2019 | Kisaichi et al. | |
| 2020/0064156 A1 | 2/2020 | Hirano et al. | |

FOREIGN PATENT DOCUMENTS

| | | | | |
|---|---|---|---|---|
| CN | 206556614 U | | 10/2017 | |
| DE | 102010041444 | | 3/2012 | |
| EP | 0071885 | | 2/1983 | |
| EP | 1544622 | | 6/2005 | |
| FR | 3843614 A1 | | 2/2004 | |
| FR | 2894665 | | 6/2007 | |
| GB | 2343955 A | * | 5/2000 | ......... F02D 41/0097 |
| JP | H09231889 | | 9/1997 | |
| JP | 2004060450 A | | 2/2004 | |
| JP | 5724337 B2 | | 5/2015 | |
| WO | WO2018042911 | | 3/2018 | |

OTHER PUBLICATIONS

"2011-17 Mustang Ford Performance High RPM Competition Ignition Pulse Ring 5.0." Late Model Restoration. (Accessed Jun. 16, 2020.).

"BMW S14 140mm Race with Integral 60-2 Trigger." TTV Racing. (Accessed Jun. 16, 2020.).

"Tone Ring." Rick's Free Auto Repair Advice. (Accessed Jun. 16, 2020.).

Mavrigian, Mike. "Installation and Removal Tips for LS Engine 24x or 58x Reluctor Wheels." On All Cylinders. Apr. 19, 2018. (Accessed Jun. 16, 2020.).

(56) References Cited

OTHER PUBLICATIONS

Notice of Allowance of U.S. Appl. No. 16/987,889 dated Jul. 8, 2021, 31 pages.
Notice of Allowance of U.S. Appl. No. 17/062,277 dated Jul. 23, 2021, 30 pages.

* cited by examiner

| Tooth Number | 414 | 416 | 418 | 420 | 422 | 424 | 426 | 428 | 430 | 432 | 434 | 436 |
|---|---|---|---|---|---|---|---|---|---|---|---|---|
| Characteristic Value | 1 | 3 | 3 | 2 | 1 | 2 | 3 | 2 | 2 | 3 | 3 | 1 |

FIG. 5

| Tooth Number | 414 | 416 | 418 | 420 | 422 | 424 | 426 | 428 | 430 | 432 | 434 | 436 |
|---|---|---|---|---|---|---|---|---|---|---|---|---|
| Characteristic Value | 1 | 3 | 3 | 2 | 1 | 2 | 3 | 2 | 2 | 3 | 3 | 1 |

FIG. 6

| Tooth Number | 414 | 416 | 418 | 420 | 422 | 424 | 426 | 428 | 430 | 432 | 434 | 436 |
|---|---|---|---|---|---|---|---|---|---|---|---|---|
| Characteristic Value | 1 | 3 | 3 | 2 | 1 | 2 | 3 | 2 | 2 | 3 | 3 | 1 |

FIG. 7

| 414 | 416 | 418 | 420 | 422 | 424 | 426 | 428 | 430 | 432 | 434 | 436 |
|---|---|---|---|---|---|---|---|---|---|---|---|
| (3,1,1) | (1,1,3) | (1,3,3) | (3,3,2) | (3,2,1) | (2,1,2) | (1,2,3) | (2,3,1) | (3,1,2) | (2,2,3) | (2,3,3) | (3,3,1) |
| 270° | 300° | 330° | 0° | 30° | 60° | 90° | 120° | 150° | 180° | 210° | 240° |

802 — top row; 804 — middle row; 806 — bottom row; 800 — overall

FIG. 8

SYSTEMS AND METHODS FOR ERROR DETECTION IN CRANKSHAFT TOOTH ENCODING

BACKGROUND

A crankshaft sensor is used to determine the position and timing of an engine of a vehicle. In particular, as a crank pulse wheel of the crankshaft turns, the crankshaft sensor detects tooth pulses corresponding to the teeth of the crank pulse wheel. The tooth pulses correspond to angular positions of the crankshaft so that the appropriate engine timing can be determined based on the position of the crank pulse wheel in combination with camshaft position information. For example, the crank pulse wheel has at least one missing or altered tooth that allows the position of the crank pulse wheel to be indexed/determined. However, using missing or altered tooth alone may require prior knowledge of the position of the crankshaft pulse wheel or the crankshaft pulse wheel must rotate past the missing or altered teeth before the crankshaft position can be determined. For example, the crank pulse wheel of the crankshaft may have to rotate 360 degrees before being able to associate a tooth pulse with a particular angular position. Accordingly, determining the position and timing of the engine may require additional time or information.

BRIEF DESCRIPTION

According to one or more aspects, a system for crankshaft tooth encoding of a crank pulse wheel of a vehicle is provided. In one embodiment, the system includes a read module, a buffer module, an error module, and a position module. The read module identifies a tooth type for N number of teeth in a sliding buffer based on at least one tooth characteristic. N is a positive integer less than a total number of teeth on the crank pulse wheel. The buffer module calculates a buffer value for the sliding buffer corresponding to a tooth represented in the sliding buffer. The error module detects an error associated with a tooth on the crank pulse wheel and calculates a revised buffer value based on the error. The position module determines an angular position of the crank pulse wheel based on the revised buffer value. The position module also broadcasts the angular position to one or more vehicle systems of the vehicle.

According to one or more aspects, a method for crankshaft tooth encoding for a crank pulse wheel of a vehicle is provided. The method includes identifying a tooth type for N number of teeth in a sliding buffer based on at least one tooth characteristic. N is a positive integer less than a total number of teeth on the crank pulse wheel. The method also includes calculating a buffer value for the sliding buffer corresponding to a tooth represented in the sliding buffer. The method further includes detecting an error associated with a tooth of the crank pulse wheel and calculating a revised buffer value based on the error. The method further includes determining an angular position of the crank pulse wheel based on the revised buffer value and broadcasting the angular position to one or more vehicle systems of the vehicle.

According to one or more aspects, a non-transitory computer-readable storage medium is provided for storing instructions that, when executed by a computer, cause the computer to perform a method for crankshaft tooth encoding for a crank pulse wheel of a vehicle. The method includes identifying a tooth type for N number of teeth in a sliding buffer based on at least one tooth characteristic. N is a positive integer less than a total number of teeth on the crank pulse wheel. The method also includes calculating a buffer value for the sliding buffer corresponding to a tooth represented in the sliding buffer. The method additionally includes detecting an error associated with a tooth of the crank pulse wheel. A revised buffer value is than calculated based on the error. A confidence parameter is then updated based on the revised buffer value. The method further includes determining an angular position of the crank pulse wheel based on the buffer value. The angular position is then broadcast to one or more vehicle systems of the vehicle.

BRIEF DESCRIPTION OF THE DRAWINGS

FIG. 5 is a crank tooth table with a first sliding buffer according to one or more embodiments.

FIG. 6 is a crank tooth table with a second sliding buffer according to one or more embodiments.

FIG. 7 is a crank tooth table with a third sliding buffer according to one or more embodiments.

FIG. 8 is a crank tooth map corresponding to FIGS. 4-7 according to one or more embodiments.

DETAILED DESCRIPTION

Figure 1:
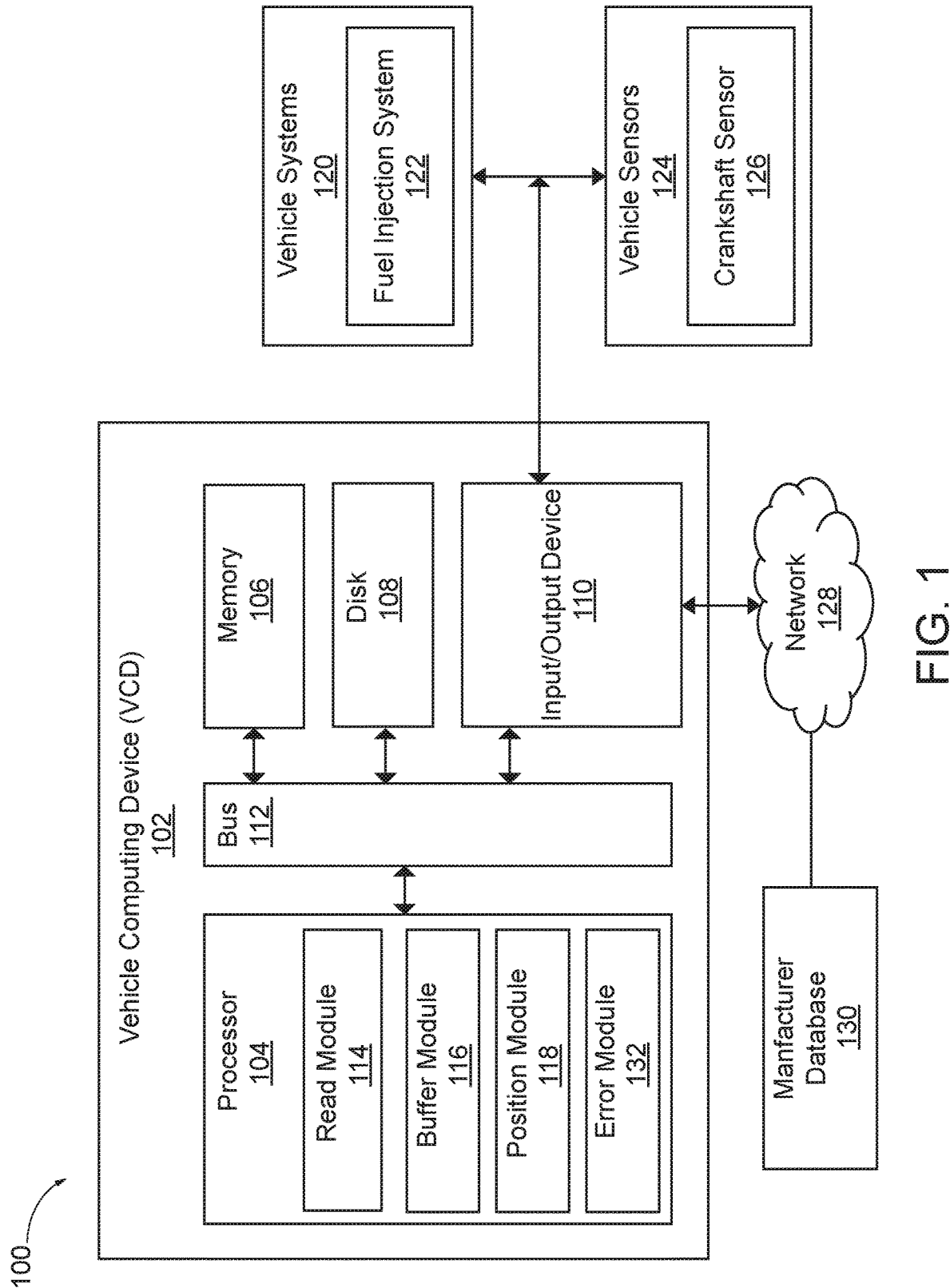
FIG. 1 is a schematic diagram of an operating environment for implementing systems and methods for crankshaft tooth encoding according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a mobile programmable agent bus that interconnects components inside a mobile programmable agent using protocols such as Media Oriented Systems Transport (MOST), Controller Area network (CAN), Local Interconnect Network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, mobile programmable agent, computing device, infrastructure device, security device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicle-to-everything (V2X) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (M IMO), telecommunications and/or cellular network communication (e.g., SMS, MMS, 3G, 4G, LTE, 5G, GSM, CDMA, WAVE), satellite, dedicated short range communication (DSRC), among others.

A "database," as used herein can refer to table, a set of tables, a set of data stores and/or methods for accessing and/or manipulating those data stores. Some databases can be incorporated with a disk as defined below.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor" as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle control system" and/or "vehicle system," as used herein can include, but is not limited to, any automatic or manual systems that can be used to enhance the vehicle, driving, and/or safety. Exemplary vehicle systems include, but are not limited to: an engine control system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), an electronic pretensioning system, a monitoring system, a vehicle suspension system, a sensory system, an interior or exterior camera system among others.

I. System Overview

Figure 2:
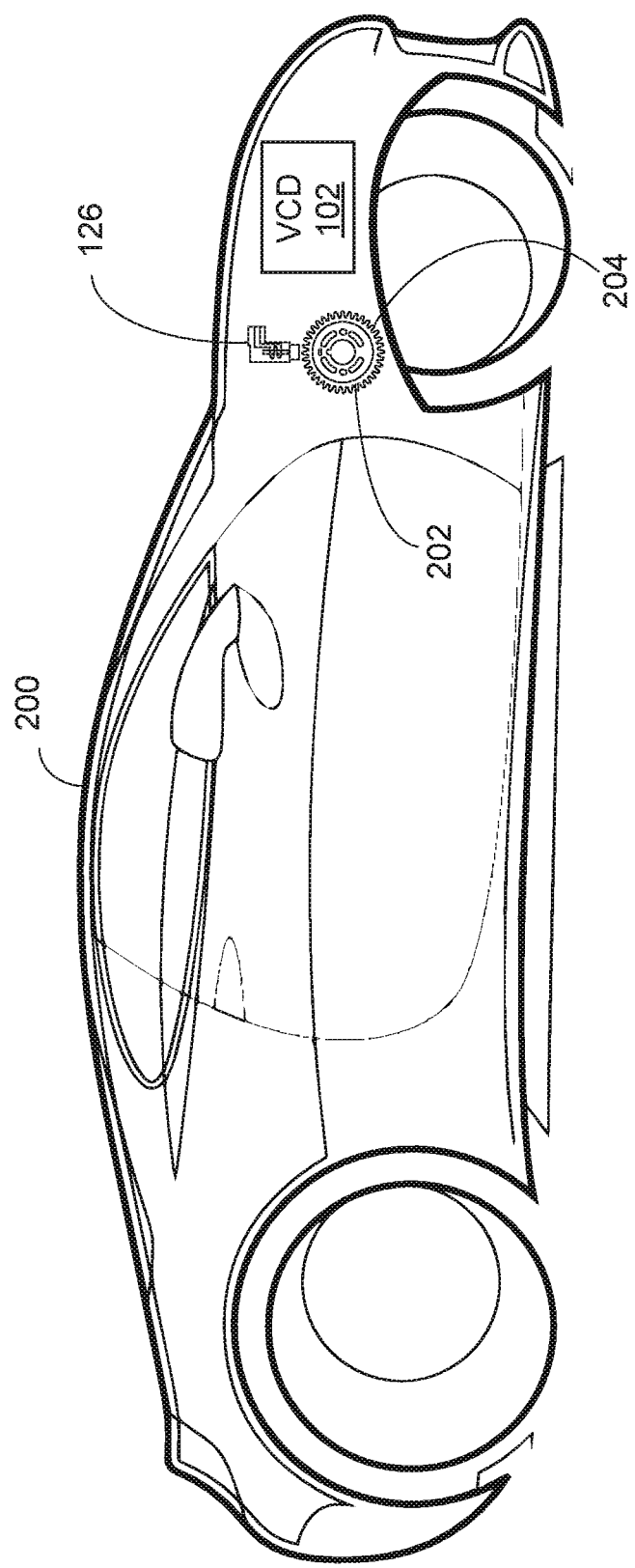
FIG. 2 is a schematic diagram of a crank pulse wheel and a crankshaft sensor according to one or more embodiments.

Referring now to the drawings, wherein the showings are for purposes of illustrating one or more exemplary embodiments and not for purposes of limiting same. FIG. 1 is a schematic diagram of an operating environment 100 for crankshaft tooth encoding. The components of operating environment 100, as well as the components of other systems, hardware architectures, and software architectures discussed herein, can be combined, omitted, or organized into different architectures for various embodiments. Further, the components of the operating environment 100 can be implemented with or associated with a vehicle 200 and a crank pulse wheel 202, as shown in FIG. 2.

In the illustrated embodiment of FIG. 1, the operating environment 100 includes a vehicle computing device (VCD) 102 with provisions for processing, communicating and interacting with various components of a vehicle, such as vehicle 200, and other components of the operating environment 100. In one embodiment, the VCD 102 can be implemented in the vehicle 200, for example, as part of a telematics unit, a head unit, a navigation unit, an infotainment unit, an electronic control unit, among others. In other embodiments, the components and functions of the VCD 102 can be implemented remotely from the vehicle 200, for example, with a portable device (not shown) or another device connected via a network (e.g., a network 128).

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 includes a read module 114, a buffer module 116, a position module 118, and an error module 132 for crankshaft tooth encoding, facilitated by the components of the operating environment 100.

The VCD 102 is also operably connected for computer communication (e.g., via the bus 112 and/or the I/O interface 110) to one or more vehicle systems 120. The vehicle systems 120 can include, but are not limited to, any automatic or manual systems that can be used to enhance the vehicle 200, driving, and/or safety. Here, as an example, the vehicle systems 120 include a fuel injection system 122. The fuel injection system 122 delivers fuel to a combustion engine of the vehicle 200 based on synchronized timing to propel the vehicle 200.

The vehicle systems 120 include and/or are operably connected for computer communication to various vehicle sensors 124. The vehicle sensors 124 provide and/or sense information associated with the vehicle 200, the vehicle environment, and/or the vehicle systems 120. Here, the vehicle sensors 124 include a crankshaft sensor 126 for detecting the teeth on a crank pulse wheel 202. In some embodiments, the crankshaft sensor is a Hall Effect sensor with a digital output or a variable reluctance sensor having an analog output. In particular, the crankshaft sensor may measure the magnetic flux corresponding to the teeth on the crank pulse wheel. The crank pulse wheel 202 has a total number of teeth that extend outward from the main body of the crank pulse wheel 202. A tooth of the total number of teeth may have a profile that is polyhydric, conical, spherical, helical, beveled, crowned, cantilevered, angled, rounded, and/or irregular shaped, among others.

The vehicle sensors 124 can include, but are not limited to, image sensors, such as cameras, optical sensors, radio sensors, electromagnetic sensors, etc. mounted to the interior or exterior of the vehicle 200. The vehicle sensors 124 may detect characteristics of the engine, such as the position, timing, velocity, etc. of the components. Accordingly, the vehicle sensors 124 are operable to sense a measurement of data associated with the vehicle 200, the vehicle environment, and/or the vehicle systems 120, and generate a data signal indicating said measurement of data. These data signals can be converted into other data formats (e.g., numerical) and/or used by the vehicle systems 120 and/or the VCD 102 to generate other data metrics and parameters. For example, the data signals may convert the sensor data to values that can be used by the VCD 102. It is understood that the sensors can be any type of sensor, for example, acoustic, electric, magnetic, radio, environmental, optical, imaging, light, pressure, force, thermal, temperature, proximity, among others.

The VCD 102 is also operatively connected for computer communication to the network 128. It is understood that the connection from the I/O interface 110 and to the network 128 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. The network 128 is, for example, a data network, the Internet, a wide area network or a local area network. The network 128 serves as a communication medium to various remote devices (e.g., databases, web servers, remote servers, application servers, intermediary servers, client machines, other portable devices). For example, the VCD 102 may receive updates from a manufacturer database 130 using the network 128.

The application of systems for and methods for crankshaft tooth encoding are described with respect to the vehicle 200. As shown in FIG. 2, the vehicle 200 includes the operating environment 100, the crank pulse wheel 202, and the crankshaft sensor 126 described above. The crank pulse wheel 202 has teeth, such as tooth 204, having a predetermined geometry defined by at least on tooth characteristic. However, the crank pulse wheel 202 is exemplary in nature and may have more or fewer teeth with different profiles, geometries, and/or configurations on the crank pulse wheel 202.

Using the system and network configuration discussed above, the crankshaft teeth can be encoded to indicate a specific angular position on the crank pulse wheel 202 which can be used to determine the position and timing of the engine of the vehicle 200. In particular, the teeth have different geometries and are ordered such that when the VCD 102 reads a certain fixed number of consecutive teeth, the angular position of the crank pulse wheel 202 can be determined. The order of the teeth on the crank pulse wheel 202 is patterned such that the angular position of the crank pulse wheel 202 can be determined regardless of where on the crank pulse wheel 202 the reading began. Detailed embodiments describing exemplary methods using the system and network configuration discussed above will now be discussed in detail.

II. Application of Systems and Methods for Tooth Encoding

Figure 3:
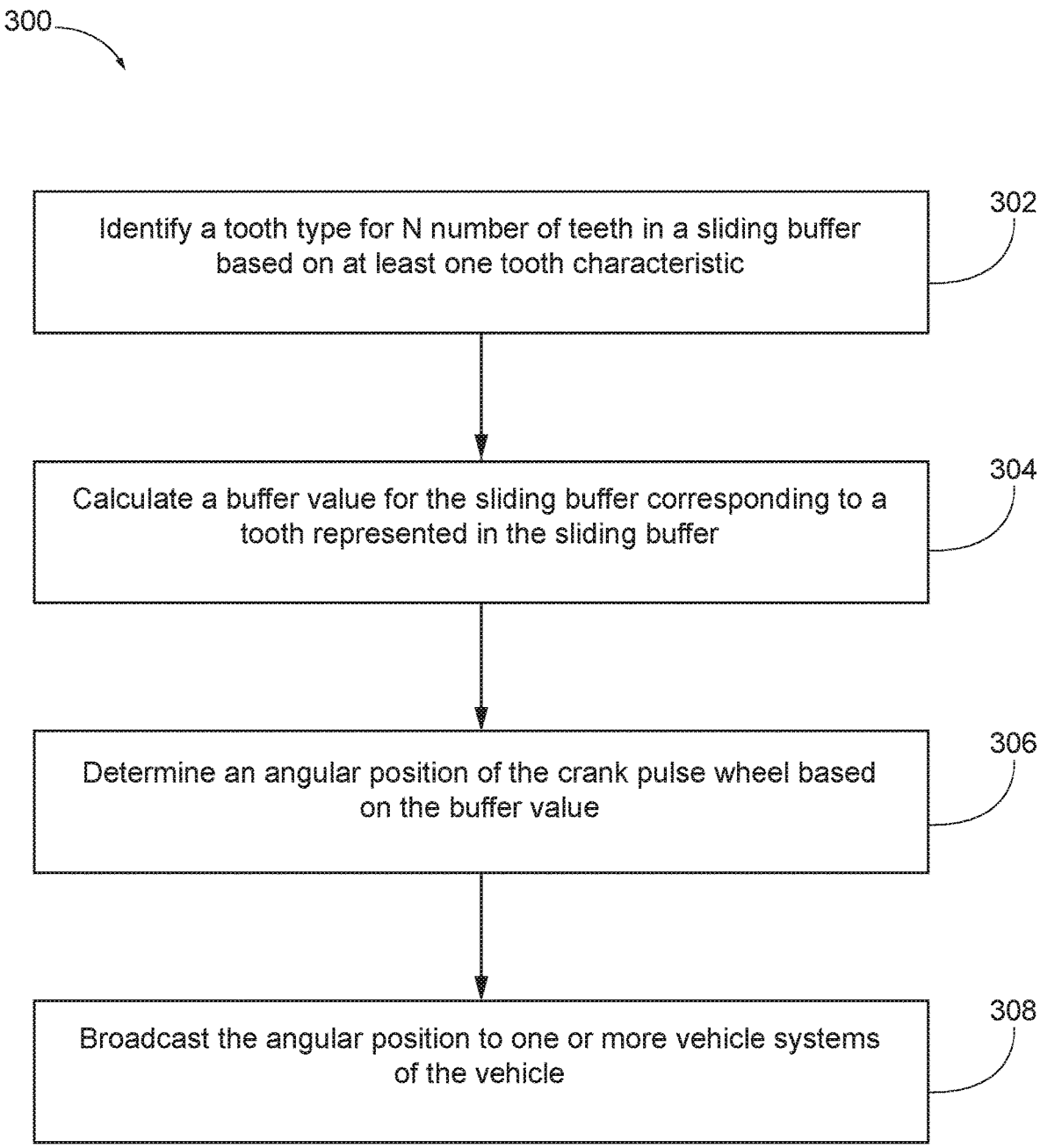
FIG. 3 is an example flow diagram of a method for crankshaft tooth encoding according to one or more embodiments.

Referring now to FIG. 3, a method 300 for crankshaft tooth encoding will now be described according to an exemplary embodiment. FIG. 3 will be described with reference to FIGS. 1, 2, and 4-9. As shown in FIG. 3, the method for providing a crankshaft tooth encoding is described according to a number of steps for simplicity, but it is understood that the elements of the method 300 can be organized into different architectures, blocks, stages, and/or processes.

At block 302, tooth types for N number of teeth of the crank pulse wheel 202 are identified based on at least one tooth characteristic. The identification processes described below are performed by, coordinated by, and/or facilitated by the read module 114. The at least one tooth characteristic is a physical geometric feature of at least some of the teeth on the crank pulse wheel 202 that make the teeth differentiable by the crankshaft sensor 126. The tooth geometry may include the size and/or shape of the teeth on the crank pulse wheel 202 or physical geometric features of the crank pulse wheel 202 itself. For example, the tooth geometry may include height, irregular formations (e.g., outcroppings, protrusions, nodules, etc.), thickness, depth, surface angle, surface patterning, voids, holes, cavities, and/or guides, among others. The tooth characteristics may also include material-based differences, differences in radiation profiles of the teeth, spectral differences on the electromagnetic spectrum, and/or optical differences, among others that can be sensed by the vehicle sensors 124.

Figure 4:
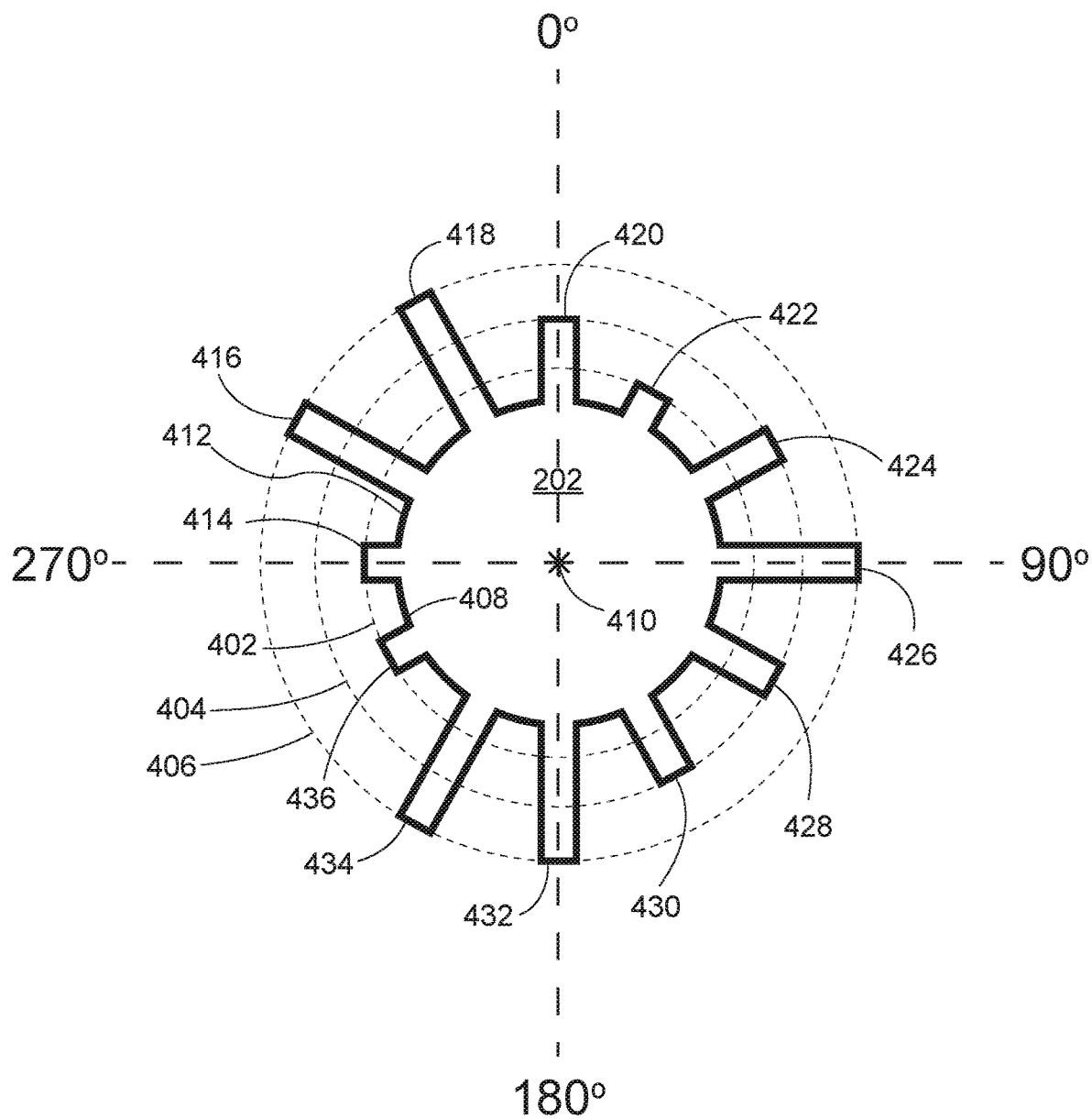
FIG. 4 is a schematic diagram of crankshaft tooth geometry of a crank pulse wheel according to one or more embodiments.

Turning to FIG. 4, suppose the at least one tooth characteristic is a height of the teeth of the crank pulse wheel 202. The read module 114 may register the height differential between the teeth by accessing the crankshaft sensor 126. The height may include a first height 402, a second height 404, and a third height 406 measured from a baseline 408. The radial distance between the baseline 408 and the center point 410 of the crank pulse wheel 202 forms the main body of the crank pulse wheel 202. Gaps are formed between the teeth, such as a gap 412 between the first tooth 414 and the second tooth 416.

The difference in the heights allows the crankshaft sensor 126 to differentiate between the teeth of the crank pulse wheel 202. In one embodiment, the read module 114 may receive the height differential as a characteristic value. For example, the characteristic value for the first height 402 is (1), the characteristic value for the second height 404 is (2), and the characteristic value for the third height 406 is (3). Accordingly, the first tooth 414 extends to the first height 402 (1), the second tooth 416 extends to the third height 406 (3), a third tooth 418 extends to the third height 406 (3), a fourth tooth 420 extends to the second height 404 (2), a fifth tooth 422 extends to the first height 402 (1), a sixth tooth 424 extends to the second height 404 (2), a seventh tooth 426 extends to the third height 406 (3), an eighth tooth 428 extends to the second height 404 (2), a ninth tooth 430 extends to the second height 404 (2), a tenth tooth 432 extends to the third height 406 (3), an eleventh tooth 434 extends to the third height 406 (3), and the twelfth tooth 436 extends to the first height 402 (1).

In some embodiments, one or more of the geometries of the teeth of the crank pulse wheel 202 is held constant to facilitate detection by the crankshaft sensor 126 and/or identification by the read module 114. For example, here the height is the differential tooth characteristic, so the width of the teeth 414-436 may be held constant and/or the size of the gap between the teeth 414-436 may be held constant. The difference between the teeth 414-436 are based on the geometric differences in the teeth rather than the size of gaps.

The read module 114 identifies a tooth type according to the tooth characteristic for teeth in a sliding buffer. The sliding buffer includes N number of teeth. N is a positive integer less than a total number of teeth of the crank pulse wheel 202. In some embodiments, the read module may identify a tooth type for each tooth in the sliding buffer. In other embodiments, the sliding buffer may include consecutive or a pattern of teeth, such as every other tooth, every third tooth, etc.

Turning to FIG. 5 is a crank tooth table 500 that includes crank tooth reference numbers corresponding to the characteristic values described with respect to FIG. 4. The crank tooth table 500 has a first sliding buffer 502. Here, the first sliding buffer 502 includes the first tooth 414 with a characteristic value (1), the second tooth 416 with a characteristic value (3), and the third tooth 418 with a characteristic value (3). Accordingly, the first sliding buffer 502 has N equal to three such that the first sliding buffer includes the characteristic value for three consecutive teeth.

The sliding buffer can be incremented by one tooth, such that the read module 114 can begin anywhere on the crank pulse wheel 202. For example, turning to FIG. 6, is a crank tooth table 600 with a second sliding buffer 602. The second sliding buffer does not begin at the fourth tooth 420, but instead includes the characteristic value of the second tooth 416. Likewise, the crank tooth table 700 of FIG. 7 illustrates a third sliding buffer 702 that begins at the third tooth 418.

Returning to FIG. 3, at block 304, a buffer value is calculated for the sliding buffer corresponding to a tooth represented in the sliding buffer. The buffer processes described below are performed by, coordinated by, and/or facilitated by the buffer module 116. The buffer module 116 may calculate the buffer value using different encoding types associated with numerical systems such as arrays, decimals, hexadecimals, binary, trinary, and transformations, among others. In some embodiments, the buffer value may be arbitrarily assigned and indexed in a crank tooth map. The buffer value may include a single parameter or multiple parameters. For example, the first sliding buffer 502 may have a first buffer value that is an array (1, 3, 3) corresponding to the characteristic values for each of the teeth in the first sliding buffer 502, as shown in FIG. 5. Alternatively, the first buffer value may use the (1, 3, 3) as the decimal value 133, the hexadecimal value 85, or the binary value 010000101. In another embodiment, the buffer value may be represented in decimal value (1, 3, 3) and the binary value (01, 11, 11) to conserve memory during operations.

At block 306, the method 300 includes determining an angular position of the crank pulse wheel 202 based on the buffer value. The positioning processes described below are performed by, coordinated by, and/or facilitated by the position module 118. The position module 118 may compare the buffer values to a listing of known angular positions. In particular, the angular position may correspond to a tooth included in the sliding buffer. For example, the first buffer value (1, 3, 3) may be compared to a crank tooth map.

FIG. 8 is a crank tooth map 800 corresponding to FIGS. 4-7. The crank tooth map is a data look up table that can be accessed by the position module 118 to determine the crankshaft position based on the buffer value of a sliding buffer. The crank tooth map may be stored locally on the VCD 102 or remotely, such as at the manufacturer database 130 and accessed over the network 128. The crank tooth map 800 includes a tooth number row 802, a sliding buffer row 804, and an angular position row 806. Rows 802-806 are merely exemplary and more or fewer rows with less or additional information may be included. For example, rather than an angle for the angular position, the crank tooth map 800 may include an indexed numerical value to indicate the position of the crank pulse wheel 202. Continuing the example, from above, buffer module 116 may determine that the first sliding buffer 502 having the characteristic values (1), (3), and (3), in that order corresponds to the angular position of 330° or the third tooth 418, as shown in FIG. 8.

Because each angular position on the crank pulse wheel 202 corresponds to a specific buffer value, the buffer values do not repeat. Therefore, the read module only needs to identify the tooth characteristic for as many teeth on the crank pulse wheel 202 as are in the sliding buffer in order for the position module 118 to determine a position on the crank pulse wheel 202. For example, returning to FIG. 6, the crank tooth table 600 with a second sliding buffer 602 includes the second tooth 416 with a characteristic value (3), the third tooth 418 with a characteristic value (3), and the fourth tooth 420 with a characteristic value (2). Suppose the buffer module 116 calculates the second buffer value as (3, 3, 2) as shown in FIG. 8. The position module 118 may determine that the second buffer value (3, 3, 2) corresponds to an angular position of 0° on the crank pulse wheel 202. Because the first buffer value (1, 3, 3) is different than the second buffer value (3, 3, 2), the position module 118 can distinguish between the angular positions indicated by the first sliding buffer 502 and the second sliding buffer 602.

As another example, in FIG. 7, the crank tooth table 500 has a third sliding buffer 702 that includes the third tooth 418 with a characteristic value (3), the fourth tooth 420 with a characteristic value (2), and the fifth tooth 422 with a characteristic value (1). Suppose the buffer module 116 calculates the third buffer value as (3, 2, 1), then the position module 118 may determine that the third buffer value (3, 2, 1) corresponds to an angular position of 30° on the crank pulse wheel 202. Because the first buffer value (1, 3, 3) is different than the second buffer value (3, 3, 2), which is different than the third buffer value (3, 2, 1) the position module 118 can distinguish between the angular positions 330°, 0°, and 30° on the crank pulse wheel 202.

The VCD 102 may require a predetermined angular resolution in order to satisfy the functional requirements of the engine (not shown) of the vehicle 200. The angular resolution describes the precision and granularity with which the angular position can be determined. In the example discussed above with respect to the FIGS. 4-8, the angular resolution is 30° because each tooth corresponds to a 30° increment around the crank pulse wheel 202. However, the angular resolution can be increased or decreased based on the number of teeth on the crank pulse wheel 202, N (the number characteristic values corresponding to the number of teeth represented in the sliding buffer), and/or the number the characteristic values that the crankshaft sensor 126 is capable of distinguishing between.

Suppose that the VCD 102 has a desired angular resolution of at least 6° to provide functionality for the vehicle systems 120 that drive the engine of the vehicle 200. Because there are 360° of rotation per revolution, to achieve an angular resolution of at least 6° the crank pulse wheel needs at least 60 teeth (assuming that the sensor can only distinguish between two tooth types). Once the total number of teeth is known, the number N of teeth in the sliding buffer can be determined based on the capability of the read module 114 to distinguish between characteristic values.

Suppose, the read module 114 is capable of a base 3 determination, meaning that the read module can distinguish between 3 different types of tooth geometry, such as the low, medium, high height example shown in FIG. 4. To afford each tooth of the crank pulse wheel 202 a unique buffer value, the number of teeth of the crank pulse wheel 202 should be less than or equal to the base, b, in this example a base of 3, to the power of N, the number of teeth represented by characteristic values in the sliding buffer.

Total Number of Teeth≤$b^N$

Suppose that the base is 3 and the N is 3, the base 3 to the power of 3 is 27. Because the number of teeth on the crank pulse wheel is 60, and 60 is greater than 27, the N being 3 is inadequate to provide each tooth of the crank pulse wheel 202 a unique buffer value. Now suppose that N is 4, base 3 to the power of 4 is 81. Because the number of teeth on the crank pulse wheel, 60, and 60 is less than 81, N being 4 is adequate to provide each tooth of the crank pulse wheel 202 a unique buffer value. Therefore, the read module 114 would determine the characteristic value, from at least 3 possible characteristic values, for at least four teeth in the sliding buffer to determine the angular position of the crank pulse wheel 202 having 60 total teeth.

Figure 9:
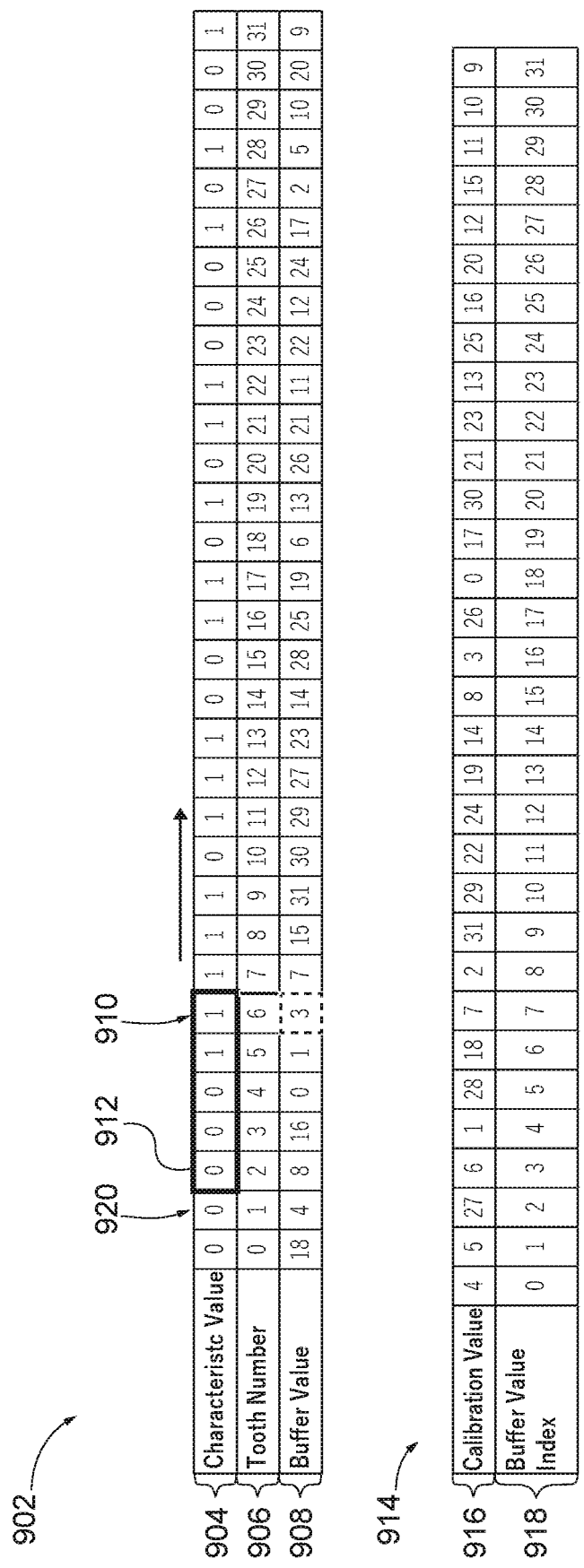
FIG. 9 is another crank tooth map corresponding to an example crank pulse wheel according to one or more embodiments.

FIG. 9 is another crank tooth map corresponding to an example crank pulse wheel according to one or more embodiments. The crank tooth map includes a tooth table 902 and a lookup table 914. The tooth table 902 includes a characteristic value row 904, a tooth number row 906, and a buffer value row 908. The characteristic value row 904 includes the characteristic values of the teeth. For example, in a column 910, tooth 6, enumerated in the tooth number row, has a characteristic value of (1) shown in the characteristic value row 904. However, the sliding buffer 912 include more than a single characteristic value. Instead, the sliding buffer 912 includes five characteristic values (0, 0, 0, 1, 1) identified by the read module 114. The buffer module 116 determines that the five characteristic values correspond to a buffer value, 3, associated with tooth 6.

The position module 118 uses the buffer value to determine the angular position of the crank pulse wheel 202. In one embodiment, the position module 118 may use a table to determine the angular position based on calibration value. For example, the lookup table 914 includes a calibration value row 916. Additionally, a buffer value index row 918 is shown for convenience but may or may not be included in the look up table. For example, the position module 118 may use the buffer value, 3, to identify the tooth corresponding to the buffer value, here, tooth 6. The tooth number may then be used to identify the angular position. For example, here the angular position may correspond to the last tooth read in the sliding buffer as it may be where the crankshaft sensor 126 last detected the crank pulse wheel 202.

Because the crank pulse wheel 202 is turning, the sliding buffer is cyclical around the wheel. Suppose that the sliding buffer includes five characteristic values representing a tooth and the four preceding teeth. For example, tooth 1, in column 920, has a sliding buffer that includes characteristic values (0, 0, 1, 0, 0) representing tooth 29, tooth 30, and tooth 31 as well as tooth 0 and tooth 1. Accordingly, the position module 118 can determine the angular position as the crank pulse wheel 202 rotates even when the sliding buffer includes N teeth which is greater than the tooth number corresponding to the last tooth represented in the sliding buffer.

Retuning to FIG. 3, at block 308, the position module 118 broadcasts the angular position to one or more vehicle systems 120 of the vehicle 200 when the angular position has been determined. For example, the angular position may be broadcast to the fuel injection system 122. In particular, the fuel injection system 122 may deliver fuel to a combustion chamber (not shown) of the engine where the fuel is mixed with air for an intake stroke. The strokes of the engine must be precisely timed for the vehicle 200 to function correctly. Accordingly, the fuel injection system 122 may receive the angular position to synchronize the functioning of one or more off the vehicle systems 120. The angular position may also be requested by one or more vehicle systems 120 and transmitted in response to the request.

The position module 118 may broadcast the angular position of the crank pulse wheel 202 using and an input/output (I/O) interface 110, the bus 112, the network 128 and/or other wired and wireless technologies. For example, the position module may transmit the angular position to the manufacturer database via the network 128 for troubleshooting, indexing, or experimental reasons. In another embodiment, the position module 118 may store the angular position in a memory 106 such that the angular position is accessible to other components.

Figure 10:
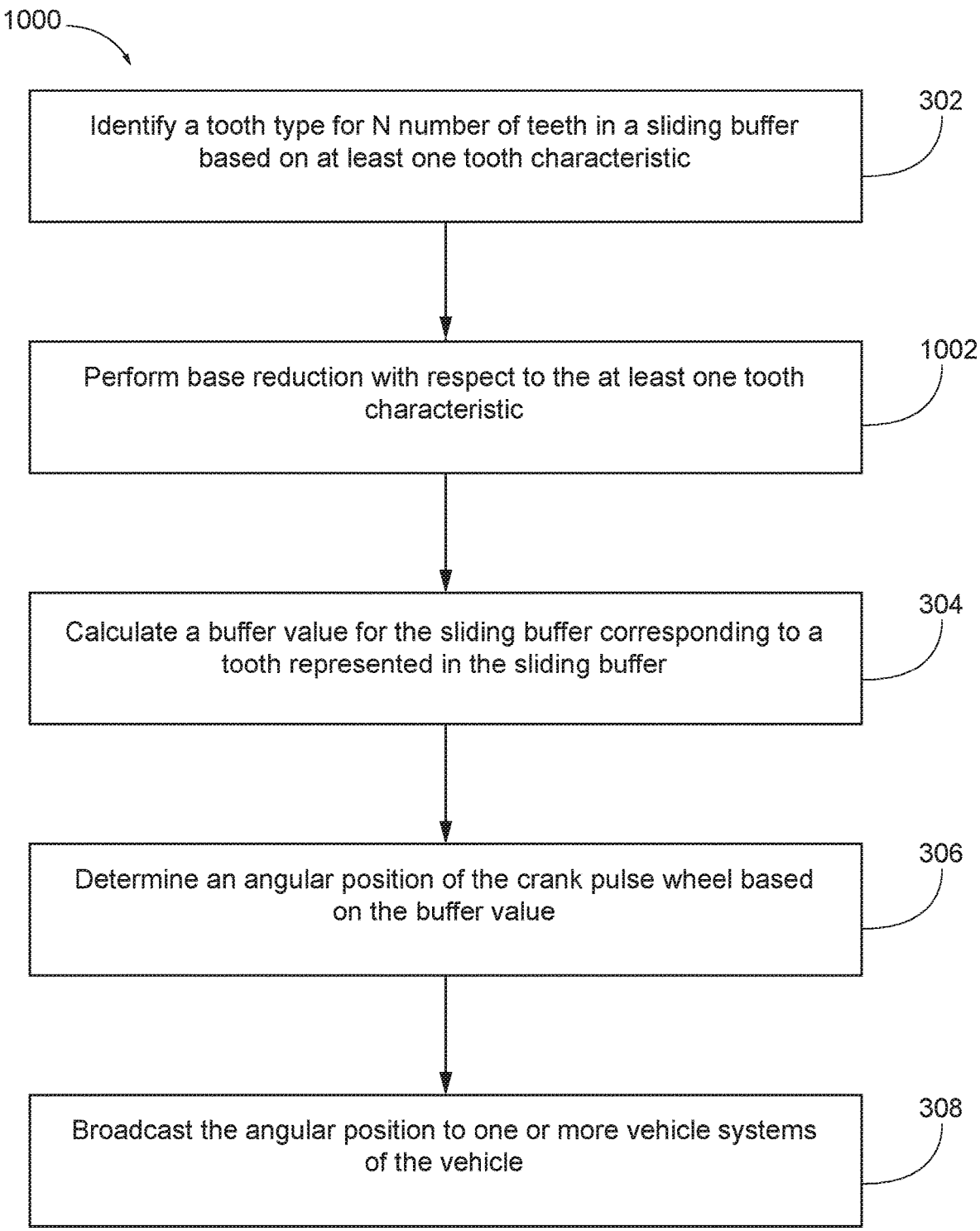
FIG. 10 is an example flow diagram of a method for crankshaft tooth encoding including base reduction according to one or more embodiments.

FIG. 10 is an example flow diagram of a method 1000 for crankshaft tooth encoding including base reduction according to one or more embodiments. FIG. 10 recites similar steps as FIG. 3 which operate in a similar manner as described above. FIG. 10 will be described with reference to FIGS. 1-4. As shown in FIG. 10, the method for providing a crankshaft tooth encoding is described according to a number of steps for simplicity, but it is understood that the elements of the method 1000 can be organized into different architectures, blocks, stages, and/or processes.

At block 302, a tooth type for N number of teeth of the crank pulse wheel 202 are identified based on at least one tooth characteristic as described above. At block 1002, the read module 114 performs a base reduction with respect to at least one tooth characteristic. The base reduction modifies the characteristic values of one or more teeth to facilitate differentiation between teeth 414-436 of the crank pulse wheel 202.

Figure 11:
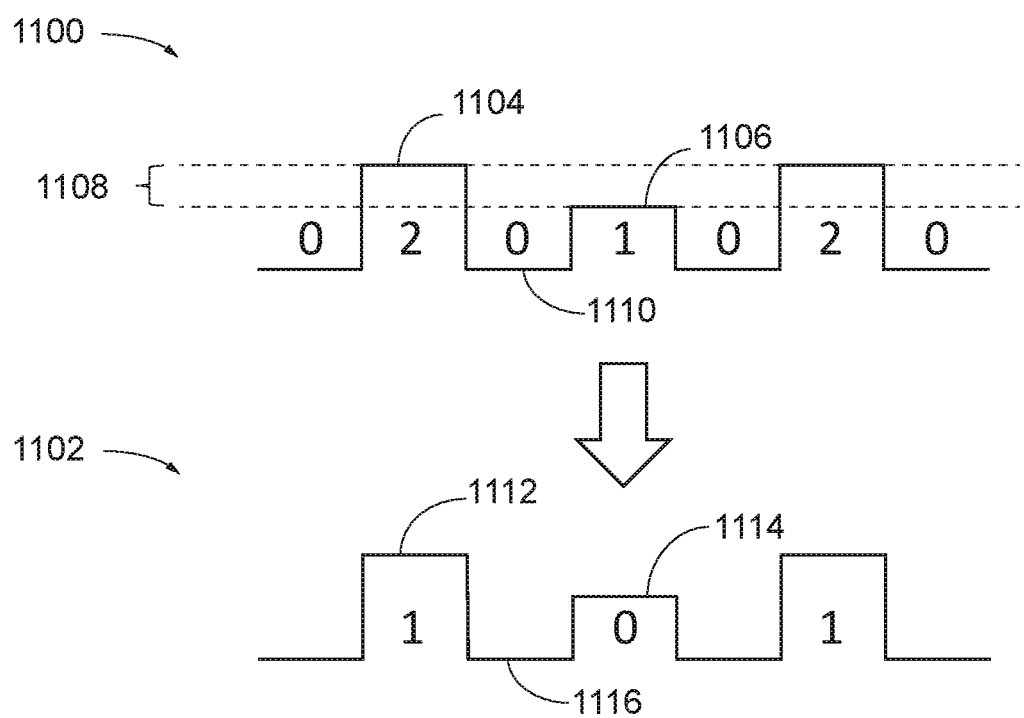
FIG. 11 is a schematic diagram of a crankshaft tooth geometry using base reduction according to one or more embodiments.

Turning to FIG. 11 is a schematic diagram of a crankshaft tooth geometry using base reduction is shown. FIG. 11 includes a first tooth pattern 1100 that is modified according to a base reduction to generate the second tooth pattern 1102. The first tooth pattern 1100 and the second tooth pattern 1102 illustrate the same tooth pattern. For example, the first tooth pattern includes a number of teeth separated by gaps.

The read module 114 is identifying tooth type for N number of teeth of the crank pulse wheel 202 based on at least one tooth characteristic. Therefore, the read module 114 may not use the gap information. Accordingly, rather than attributing characteristic values, such as 0, to the gaps, the read module 114 may perform a base reduction to discard information about the gaps, thereby allowing a characteristic value assigned to the gaps to be attributed to a tooth characteristic.

Suppose that the first tooth 1104 of the first tooth pattern 1100 has a height differential with the second tooth 1106 of the first tooth pattern 1100. For example, the first tooth 1104 may have a height that is greater than the second tooth 1106 by a height differential 1108. The teeth are separated by gaps such as gap 1110 that acts as a baseline. Accordingly, when determining the characteristic values of the tooth characteristics of the gap may be assessed as (0) such that the read module 114 applies a characteristic value of (1) to the second tooth 1106 and a characteristic value of (2) to the first tooth 1104 due to the higher height of the first tooth 1104 as compared to the second tooth 1106. However, the gap information is disregarded and the characteristic values are determined based on the relative tooth characteristics, such as the relative height, of the teeth.

Therefore, the read module 114 may perform a base reduction to disregard the gap information. Here the zeroes applied to the gaps. The base reduction can then reduce the characteristic values for the teeth. For example, the first base reduced tooth 1112 of the second tooth pattern 1102 has a height differential with the second base reduced tooth 1114 of the second tooth pattern 1102. For example, first base reduced tooth 1112 may have a height that is greater than the second base reduced tooth 1114 by a height differential 1108. The teeth are separated by gaps such as gap 1116 that acts as a baseline. However, here, the due to base reduction, characteristic values are not applied to the gaps.

Accordingly, when determining the characteristic values of the tooth characteristics, the read module 114 applies a characteristic value of (0) to the second base reduced tooth 1114 and a characteristic value of (1) to the first base reduced tooth 1112 due to the higher height of the first base reduced tooth 1112 as compared to the second base reduced tooth 1114. Therefore, rather than using three characteristic values (0), (1), and (2) used with the first tooth pattern 1100, the second tooth pattern 1102 requires fewer characteristic values (0) and (1) to encode the teeth. Base reduction reduces the processing resources, including time, necessary to read and utilize the characteristic values. Given the example from above, the buffer module 116 does not need to use trinary processes to generate the buffer value from the characteristic values, but instead could use binary encoding.

Figure 12:
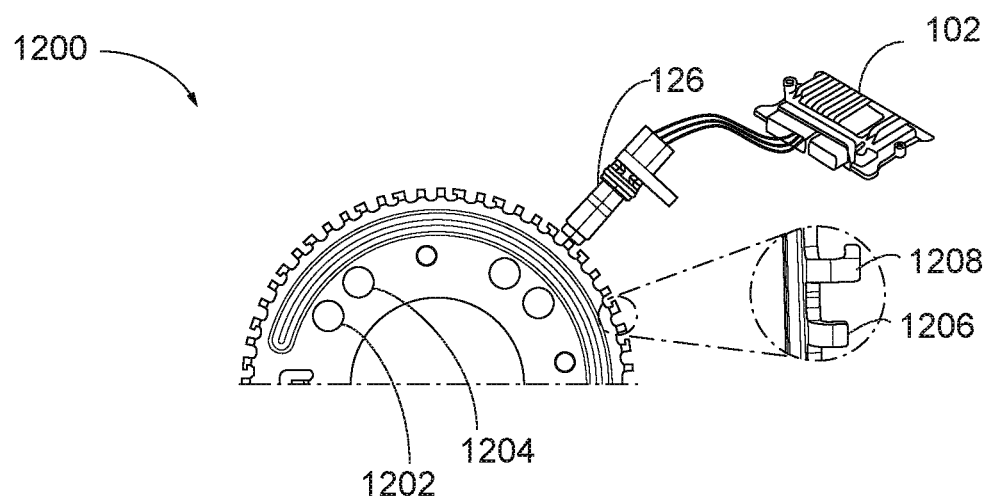
FIG. 12 is a schematic diagram of an alternative crankshaft tooth geometry of a crank pulse wheel according to one or more embodiments.

FIG. 12 is a schematic diagram of an alternative crankshaft tooth geometry of a crank pulse wheel according to one or more embodiments. The crank pulse wheel 1200 has a number of teeth being sensed by the crankshaft sensor 126, which are then received at the VCD 102. Here the crank pulse wheel 1200 may include a number of holes, such as a first hole 1202 and a second hole 1204. The holes 1202 and 1204 may change the manner in which the crankshaft sensor 126 senses the teeth. For example, the crankshaft sensor 126 may include a depth sensor that can determine the depth of the tooth gear at a position corresponding to a tooth such that teeth can additionally be differentiated by relative depth. Alternatively, the holes 1202 and 1204 may be sensed separately from the teeth and those sensed values may be applied to the characteristic values of the teeth. For example, the holes may be sensed by a separate sensor (not shown) from the crankshaft sensor 126.

In addition to the geometric features of the crank pulse wheel 1200, the teeth may have geometric features that change the shape of the individual teeth. For example, a first tooth 1206 has a profile that is vertically linear with respect to the radius of the crank pulse wheel 1200, while the second tooth 1208 has a protrusion in that causes the profile of the second tooth 1208 to include at least one angle. In particular, the profile of the protrusion of the second tooth 1208 is cantilevered with respect to the main body of the second tooth 1208. The crankshaft sensor 126 may detect both the profile of the teeth and the physical features of the crank pulse wheel 202. For example, the crankshaft sensor 126 may include a plurality of sensors, such as an optical sensor and a Hall Effect sensor.

Figure 13:
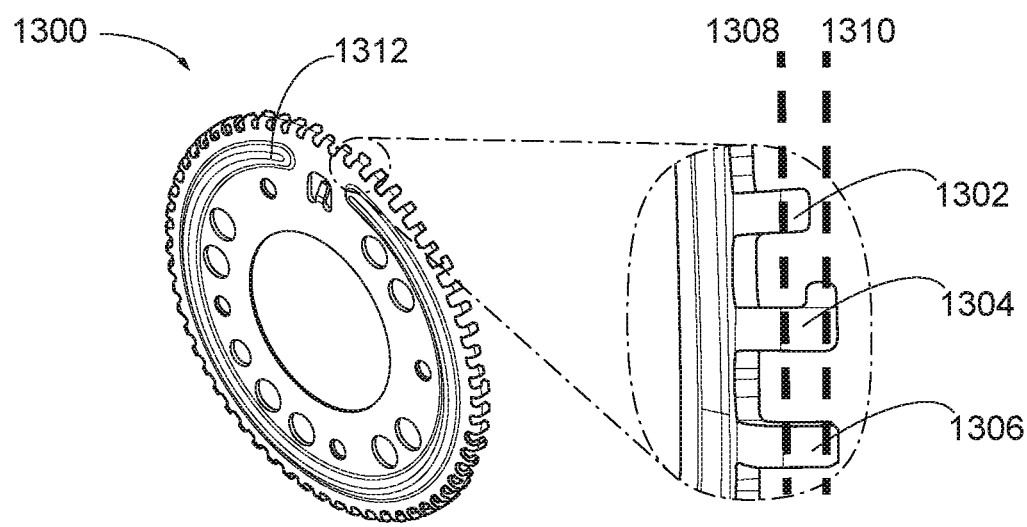
FIG. 13 is a schematic diagram of a crankshaft pulse wheel having a guide according to one or more embodiments.

Turning to FIG. 13, the crank pulse wheel 1300 includes a first tooth 1302, a second tooth 1304, and a third tooth 1306. The teeth 1302-1306 have different have different widths that are variable with respect to the height of the teeth 1302-1306. For example, the first tooth 1302 may be a low tooth, the second tooth 1304 may be a protrusion tooth, and the third tooth 1306 may be a high tooth. Suppose the first axis 1308 is a low axis separated from the second axis 1310 by a height differential. The first tooth 1302 may only intersect the first axis 1308 because of the low height of the first tooth 1302. The second tooth 1304 may have a first width at the first axis 1308 but a different, here longer, width at the second axis 1310. The third tooth may have the same width at both the first axis 1308 and the second axis 1310. Accordingly, the crankshaft sensor 126 may differentiate between the teeth based on multiple tooth characteristics, and the multiple characteristics may be based on the comparative geometric features relative to the crank pulse wheel 1300.

Furthermore, the crank pulse wheel 1300 also has a guide 1312. Like the holes 1202 and 1204 of the crank pulse wheel 1200, the guide 1312 of the crank pulse wheel 1300 is a feature of the crank pulse wheel 1300 to facilitate differentiation between the teeth of the crank pulse wheel 1300. For example, the guide 1312 may change the width of the main body of the crank pulse wheel 1300 with respect to one or more teeth. Because the teeth on the crank pulse wheel 1300 are differentiable, the teeth can be ordered to encode angular positions into the pattern of teeth. Therefore, when the buffer module 116 can calculate a buffer value based on the tooth characteristics identified in a sliding buffer identified by the read module 114. Because each sliding buffer has a unique buffer value corresponding to an angular position, the position module 118 can determine the angular position based on a reading of only as many teeth as are in the sliding buffer. Therefore, the angular position can be determined after a fixed rotational amount without prior knowledge of the position of the crank pulse wheel 1300 or without reading and indexing each of the teeth on the crank pulse wheel 1300.

Figure 14:
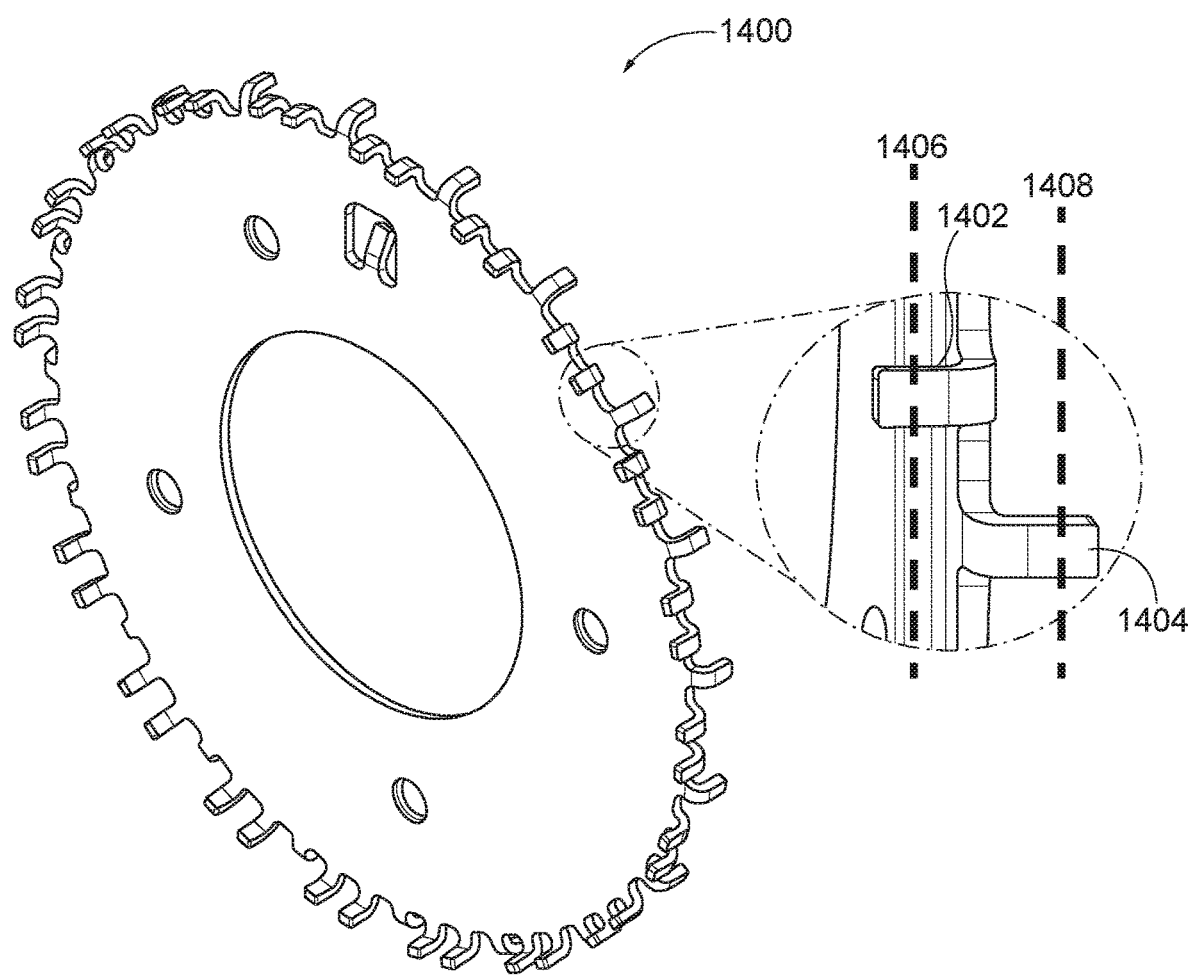
FIG. 14 is a schematic diagram of a crankshaft pulse wheel having multiple sensory axes according to one or more embodiments.

FIG. 14 is a schematic diagram of a crankshaft pulse wheel having multiple sensory axes according to one or more embodiments. The crank pulse wheel 1400 includes a first tooth 1402 and a second tooth 1404. The first tooth 1402 and the second tooth 1404 have protrusions that extend over a first axis 1406 or a second axis 1408. For example, the first tooth 1402 has a protrusion that meets or extends over the first axis 1406. Likewise, the second tooth 1404 has a protrusion that meets or extends over the second axis 1408. Accordingly, the teeth are differentiable based on the direction of the protrusion of the teeth.

The teeth may additionally be differentiable based on the height of the teeth. For example, the protrusions may extend from the tooth at varying heights (e.g., low, medium, high), extend at different angles, the protrusions may have different lengths or shapes, etc. Therefore, as discussed above, the crankshaft sensor 126 may differentiate between the teeth based on multiple tooth characteristics, and the multiple characteristics may be based on the comparative geometric features relative to the crank pulse wheel 1400.

III. Application of Systems and Methods for Error Detection

During the normal operation of the systems and methods described above, errors may occur. For example, the read module 114 may incorrectly identify a tooth type for a tooth on the crank pulse wheel 202 As another example, the crankshaft sensor 126 may send the incorrect signal to the VCD 102. Identification errors can negatively impact the operation of the vehicle 200. Specifically, identification errors may result in the ignition timing being incorrect, which can degrade performance and increase emissions of the vehicle 200. Generally, there are three categories of errors: tooth misidentification, tooth non-detection, and phantom tooth detection.

A tooth misidentification error occurs when a tooth on the crank pulse wheel 202 is detected the by the crankshaft sensor 126, but the read module 114 or the crankshaft sensor 126 incorrectly encodes the tooth. For example, returning to FIG. 4, the first tooth 414 extends to the first height 402. The first tooth 414 would be the subject of a tooth misidentification error if the read module 114 encoded the first tooth 414 as extending to any height other than the first height 402, such as the second height 404, the third height 406

A tooth non-detection error occurs when either the crankshaft sensor 126 fails to detect a tooth and/or the read module 114 fails to encode the tooth. For example, suppose that the read module 114 encodes that the first tooth 414 extends to the first height 402, may encode the gap 412, and encodes that the third tooth 418 extends to the third height 406, but the read module 114 does not encode that the second tooth 416 extends to the third height 406. Then then second tooth 416 would be the subject of a tooth non-detection error because the tooth type was not identified for the second tooth 416.

A phantom tooth detection error occurs when either the crankshaft sensor 126 detects a tooth that is not on the crank pulse wheel 202 and/or the read module 114 encodes a tooth that is not on the crank pulse wheel. The failure may be a result of noise or an intermittent electrical connection. For example, suppose that the read module 114 first encodes that the first tooth 414 extends to the first height 402. Next, the read module 114 encodes a phantom tooth extends to the first height 402 at location corresponding to the gap 412. Then the read module 114 encodes that the second tooth 416 extends to the third height 406. The phantom tooth being encoded as the first height 402 rather than the gap 412 is the subject of the phantom tooth detection error.

To detect errors, the error module 132 performs error detection, such as encoded value error detection and/or time-based error detection. The encoded value error detection is based on the buffer values being known. As discussed above, the angular position of the crank pulse wheel 202 corresponds to a specific buffer value. Therefore, given a first angular position, the next angular position should result in the next buffer value being calculated. However, an identification error may result in an immediate failure. For example, suppose the buffer module 116 calculates that the first sliding buffer 502 as having the characteristic values (1), (3), and (3), in that order corresponds to the angular position of 330° or the third tooth 418, as shown in FIG. 8. The buffer module 116 may then predict that the second buffer value be (3, 3, 2) because the second buffer value (3, 3, 2) corresponds to a next angular position, 0°, on the crank pulse wheel 202. However, suppose the read module 114 misidentifies the fourth tooth 420 as extending to the first height 402 rather than the second height 404. Then, the second buffer would erroneously read (3, 3, 1) which corresponds to an angular position of 240°, as shown in FIG. 8.

The error module 132 may flag an error, here a misidentification error, based on information from the read module 114, the buffer module 116, and/or the position module 118. For example, the error module 132 may compare the next encoded tooth as read by the read module 114, such as the fourth tooth 420 as extending to the first height 402, to the expected value for the fourth tooth 420, the second height 404. Therefore, the error module 132 is configured to compare an expected tooth type to the identified tooth type for the tooth to detect the error. In one embodiment, the expected tooth type is determined based on a crank tooth map. When the encoded value is unexpected, the error module 132 may flag an error. Accordingly, the error module 132 may detect a tooth misidentification error as soon as the misidentified tooth is encoded by the read module 114.

Likewise, the error module 132 may compare the expected buffer value to the calculated buffer value to detect an error. Accordingly, the error module 132 may compare the erroneous second buffer value (3, 3, 1) calculated by the buffer module 116 to the expected second buffer value (3, 3, 2). Similarly, the error module 132 may predict an angular position of 0° after the angular position of 330° is determined by the position module 118. By comparing the angular position of 240° to the predicted angular position of 0°, the error module 132 may flag the second erroneous buffer or the angular position of 240° as an error.

To make the comparisons, the error module 132 may maintain a crank tooth map or one or more look-up tables of expected values. Additionally or alternatively, the error module 132 may access one or more look-up tables maintained by the read module 114, the buffer module 116, and/or the position module 118. In another embodiment, the error module may access and/or query the manufacturer database 130 using the network 128.

In response to the misidentification error being flagged, the error module 132 may correct the position based on the expected value. For example, suppose that the read module 114 misidentifies the fourth tooth 420 as extending to the first height 402 and thus encodes (1) rather than (2). If the error module 132 has confidence in the previous encoding, the error module 132 may correct the misidentification, here by overwriting the (1) with (2). In this manner, the error module 132 can immediately correct misidentifications before there is a negative impact on the ignition timing of the vehicle 200.

Figure 15:
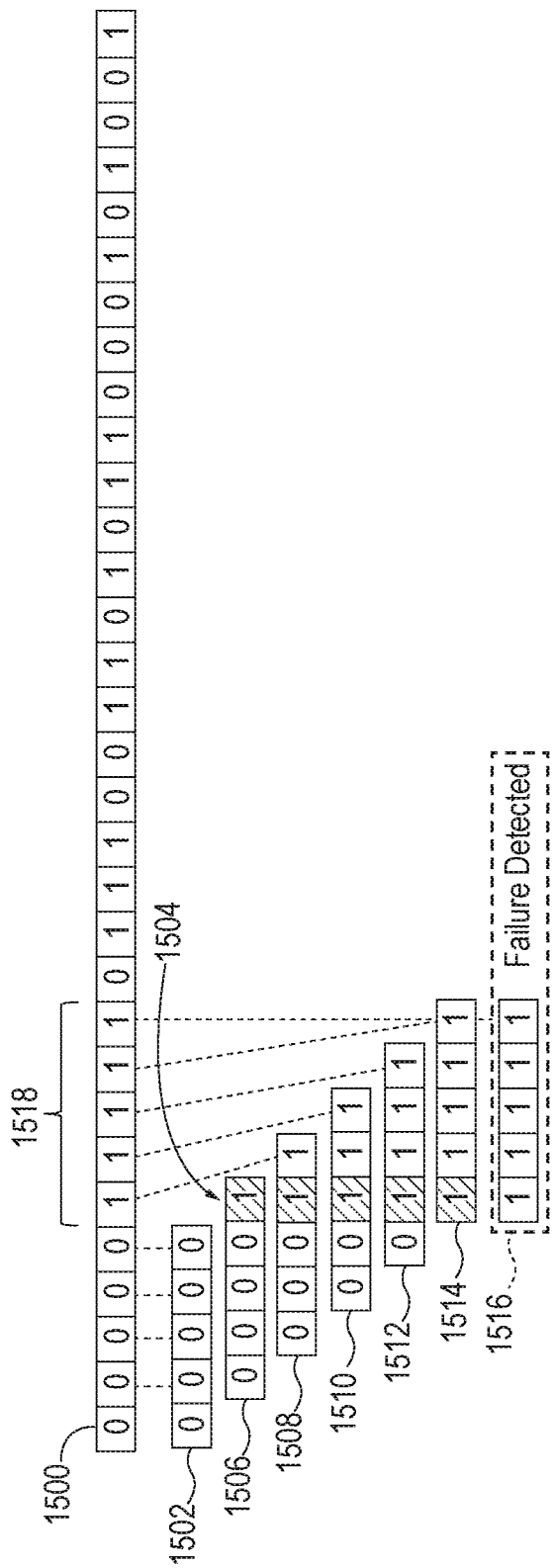
FIG. 15 illustrates sliding buffers of a crank tooth table for encoded value error detection according to one or more embodiments.

Although a misidentification error is described, the error module 132 can also identify tooth non-detection errors and phantom tooth detection errors. Turning to FIG. 15, sliding buffers of a crank tooth table 1500 for encoded value error detection are shown. Suppose that the read module 114 correctly encodes each of the buffer values for a first sliding buffer 1502, however detects a phantom tooth 1504 resulting in the second sliding buffer 1506 having a (1) that does not correspond to a tooth on the crank pulse wheel 202. As the read module 114 continues to encode characteristic values for teeth that do exist on the crank pulse wheel 202, the characteristic value of the (1) propagates through the sliding buffers, such as a third sliding buffer 1508, a fourth sliding buffer 1510, a fifth sliding buffer 1512, and a sixth sliding buffer 1514, Because crank pulse wheel 202 has a chain 1518 of identical consecutive characteristic values, the error module 132 may not detect the error until the number of characteristic values encoded since the error occurred exceeds the number of characteristic values in the chain. This is the upper limit of a detection time when using encoded value detection. For example, here the chain includes 5 characteristic values of (1) consecutively. The phantom tooth 1504 is detected in the second sliding buffer 1506. The error module 132 is unable to detect the error until the seventh sliding buffer 1516, when the last characteristic value should be a (0) but instead is a (1). Similarly, a missing tooth may not be detected until the number of sliding buffers calculated since the error occurred exceeds the number of characteristic values in the chain 1518 of identical consecutives characteristic values.

Figure 16:
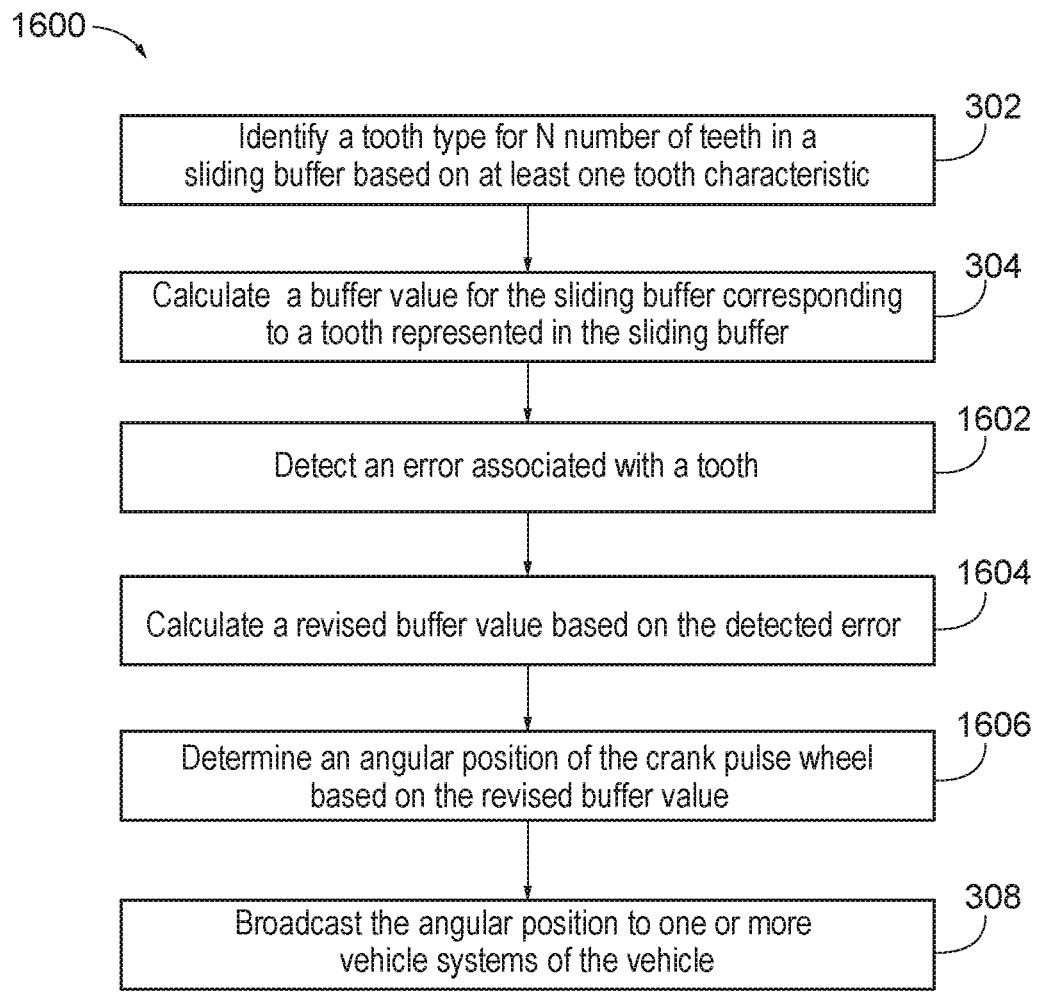
FIG. 16 is an example flow diagram of a method for error detection according to one or more embodiments.

FIG. 16 is an example flow diagram of a method 1600 for identification error detection according to one or more embodiments. FIG. 16 will be described with reference to FIGS. 3 and 15. As shown in FIG. 16, the method 1600 is described according to a number of steps for simplicity, but it is understood that the elements of the method 1600 can be organized into different architectures, blocks, stages, and/or processes.

At block 302, a tooth type for N number of teeth of the crank pulse wheel 202 are identified based on at least one tooth characteristic as discussed above with respect to FIG. 3. At block 304, a buffer value is calculated for the sliding buffer corresponding to a tooth represented in the sliding buffer, also described with respect to FIG. 3.

At block 1602, an error associated with a tooth of the crank pulse wheel is detected by the error module 132. The error may be detected based on comparing a read tooth type to an expected tooth type. For example, as discussed above the read module 114 may encode the fourth tooth 420 based on the tooth type. This read value may be compared to the expected value for the fourth tooth 420, the second height 404. Accordingly, the error module 132 would detect an error.

In another example, turning to FIG. 15, the error is detected based on the calculated seventh sliding buffer 1516. The error may be detected based on the expected buffer value after the sixth sliding buffer 1514 being (1, 1, 1, 1, 1) being (1, 1, 1, 1, 0). In another embodiment, a subsequent sliding buffer may be compared to a previous sliding buffer to detect an error. For example, here the buffer of the sixth sliding buffer 1514 and the seventh sliding buffer 1516 are both (1, 1, 1, 1, 1) due to the error in identifying a tooth type for a phantom tooth. As discussed above, each tooth of the crank pulse wheel 202 may correspond to a unique buffer value. Accordingly, two buffer values would not be the same. Thus, a duplicate buffer value is indicative of an error. In this manner, the error module 132 may detect errors by comparing and/or predicting what a next tooth type and/or buffer value should be based on the previous buffer value or an expected value. Thus, the error module 132 can detect tooth misidentification errors, tooth non-detection errors, and phantom tooth detection errors at block 1602.

At block 1604 of the method 1600, the error module 132 calculates a revised value based on the detected error. In one embodiment, the error module 132 may modify one or more tooth types based on the expected tooth type. Continuing the example from above, the error module 132 may revise the erroneous second buffer value (3, 3, 1) calculated by the buffer module 116 to the expected second buffer value (3, 3, 2). In another embodiment, the error module may receive the seventh sliding buffer 1516 of (1, 1, 1, 1, 1), recognize that the seventh sliding buffer 1516 is a duplicate, and revise the seventh sliding buffer 1516 to the expected sliding buffer of (1, 1, 1, 1, 0).

At block 1606, the method 1600 includes determining an angular position of the crank pulse wheel 202 based on the revised buffer value and/or the revised tooth type identified for a tooth of the N number of teeth. The position module 118 may compare the revised buffer values to a listing of known angular positions. In particular, the angular position may correspond to a tooth included in the sliding buffer based on the crank tooth map in a similar manner as described above with respect to block 306 of FIG. 3.

At block 308, the position module 118 broadcasts the angular position to one or more vehicle systems 120 of the vehicle 200 when the angular position has been determined. As discussed above, tooth non-detection errors and phantom tooth detection errors may not be detected immediately due to the error module 132 not detecting the error until the number of characteristic values encoded since the error occurred exceeds the number of characteristic values in the chain 1518. Thus, in some embodiments, the one or more vehicle systems 120 may update their positioning based on the broadcast to compensate for the delay. For example, in FIG. 15, when the phantom tooth 1504 is detected in the second sliding buffer 1506, the position module 118 may erroneously determine the angular position based on the phantom tooth 1504. Suppose, that the position module 118 has an angular resolution of 6° on a crank pulse wheel having 60 teeth and a read module 114 configured to distinguish between two tooth types. Here, the position module 118 would determine the angular position being 6° ahead on the crank pulse wheel due to the phantom tooth 1504. This may cause problems for the one or more vehicle systems 120. Accordingly, the angular position may be updated and broadcast to correct for an erroneous angular position that may have been propagated.

Additionally, to cope with the delay in detecting tooth non-detection errors and phantom tooth detection errors, the error module 132 may additionally or alternatively perform time-based error detection. Time based error detection is based on the differential arrival time between read teeth detected by the read module 114. Because the teeth have known locations about the crank pulse wheel, the pulse ratios are a known value. In one embodiment, the teeth are formed at equal intervals about the crank pulse wheel 202. For example, because there are 360° of rotation per revolution, a crank pulse wheel having 60 teeth would achieve an angular resolution of 6° given equally spaced teeth. The pulse ratio defines the length of time used by the read module 114 to detect an initial tooth relative to a subsequent tooth. Given that the teeth are evenly spaced, it follows that it would take approximately the same amount of time for the read module 114 to identify the tooth types of adjacent teeth.

Figure 17:
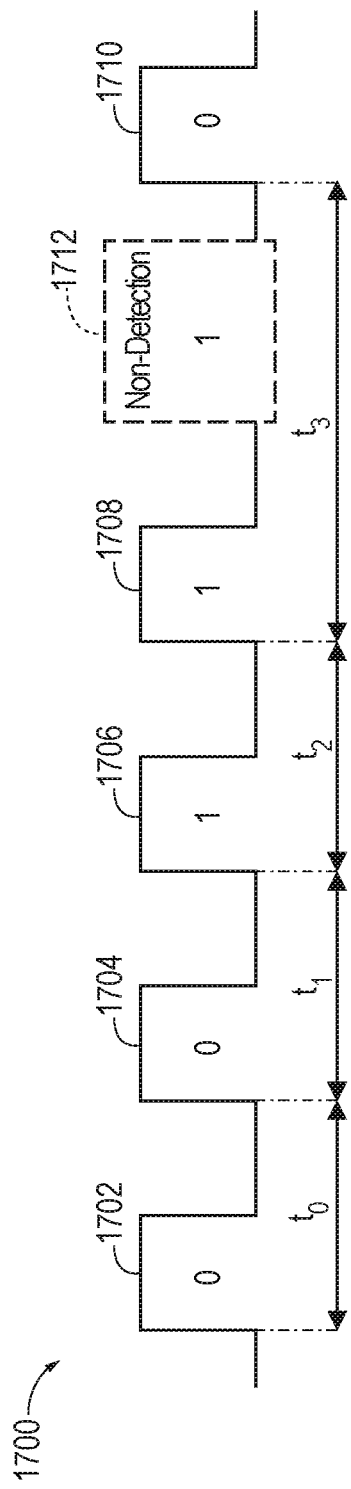
FIG. 17 is a timing diagram for missed tooth detection according to one or more embodiments.

Turning to the timing diagram 1700 of FIG. 17, the time $t_0$ corresponds to the amount of time it would take the read module 114 to identify the tooth type for a first tooth 1702 to a second tooth 1704. The time $t_1$ corresponds to the amount of time it would take the read module 114 to identify the tooth type for the second tooth 1704 to a third tooth 1706. The time $t_2$ corresponds to the amount of time it would take the read module 114 to identify the tooth type for the third tooth 1706 to a fourth tooth 1708. The time $t_3$ corresponds to the amount of time it would take the read module 114 to identify the tooth type for the fourth tooth 1708 to a sixth tooth type 1710. In the timing diagram 1700, the fifth tooth 1712 is, erroneously, not detected.

When the teeth are correctly detected, the pulse ratios, given by:

$$r_1 = \frac{t_1}{t_0}, r_2 = \frac{t_2}{t_1}, r_3 = \frac{t_3}{t_2}$$

should be approximately equal to one. For example, given that the first tooth 1702, the second tooth 1704, and the third tooth 1706 are evenly spaced, the time to calculated from the first tooth 1702 to the second tooth 1704 should be approximately equal to the time $t_1$ calculated from the second tooth 1704 to the third tooth 1706, such that the ratio, $r_1$, of $t_0:t_1$ is about one. Likewise, because the second tooth 1704, and the third tooth 1706, and the fourth tooth 1708 are evenly spaced, the ratio, $r_2$, of $t_1:t_2$ is about one.

However, because the fifth tooth was not detected, the time $t_3$ from the fourth tooth 1708 to the sixth tooth type 1710 erroneously appears to be twice as long as the time $t_2$ between the third tooth 1706 and the fourth tooth 1708. Therefore, the ratio $r_3$, of $t_2:t_3$ may be determined to be approximately two rather than one. Accordingly, the ratio $r_3$ results in an unexpected value given what is known about the exemplary crank pulse wheel having evenly spaced teeth. The error module 132 may compare the calculated ratio $r_3$, being a 2, to an expected value of 1, and detect an error based on the discrepancy. Accordingly, using time-based error detection, the error module 132 may immediately detect a tooth non-detection error at the next tooth timing.

Figure 18:
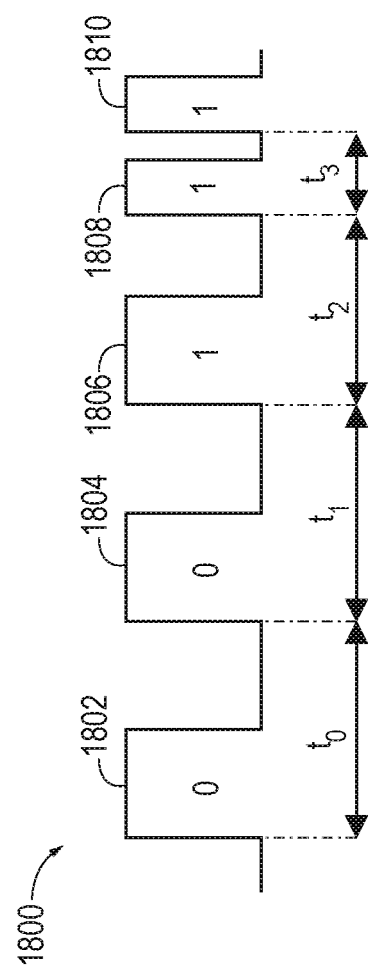
FIG. 18 is a timing diagram for phantom tooth detection according to one or more embodiments.

Similarly, using time-based error detection, the error module 132 may immediately detect a phantom tooth detection error. Turning to the timing diagram 1800 of FIG. 18, the time to corresponds to the amount of time it would take the read module 114 to identify the tooth types for a first tooth 1802 and a second tooth 1804. The time $t_1$ corresponds to the amount of time it would take the read module 114 to identify the tooth types for the second tooth 1804 and a third tooth 1806. The time $t_2$ corresponds to the amount of time it would take the read module 114 to identify the tooth types for the third tooth 1806 and a phantom tooth 1808. As discussed above, the phantom tooth 1808 does not correspond to a tooth on the crank pulse wheel, but is instead a consequence of an error of the read module 114 or the crankshaft sensor 126. The time $t_3$ corresponds to the amount of time it would take the read module 114 to identify the tooth types for the phantom tooth 1808 and a fourth tooth 1810, since the phantom tooth 1808 was previously detected.

Suppose that the first tooth 1802, the second tooth 1804, and the third tooth 1806 are evenly spaced, the time to calculated from the first tooth 1802 to the second tooth 1804 should be approximately equal to the time $t_1$ calculated from the second tooth 1804 to a third tooth 1806, such that the ratio $r_1$, of $t_0:t_1$ is about one. However, in this example, the phantom tooth 1808 was detected between the third tooth 1806 and the fourth tooth 1810. Accordingly, the time $t_2$ from the third tooth 1806 to the phantom tooth 1808 is shorter than $t_1$. Thus, the ratio $r_2$, of $t_1$:$t_2$ erroneously appears to be, for example, one half instead of one. The error module 132 may compare the calculated ratio $r_2$, being ½, to an expected value of 1 as was determined for the previous ratio $r_1$, and detect an error based on the discrepancy. Accordingly, using time-based error detection, the error module 132 may immediately detect a phantom tooth detection error. Likewise, the time $t_3$ from the phantom tooth 1808 to the fourth tooth 1810 is shorter than $t_2$. The error module 132 may compare the calculated ratio $r_3$, and again detect an error based on the discrepancy. The error module may determine that a phantom tooth detection error has occurred based on one or more sequential ratios being fractions of the expected value. Accordingly, the expected values corresponding to the timing between adjacent teeth can be used by the error module 132 to detect tooth non-detection errors and phantom tooth detection errors as they occur.

Figure 19:
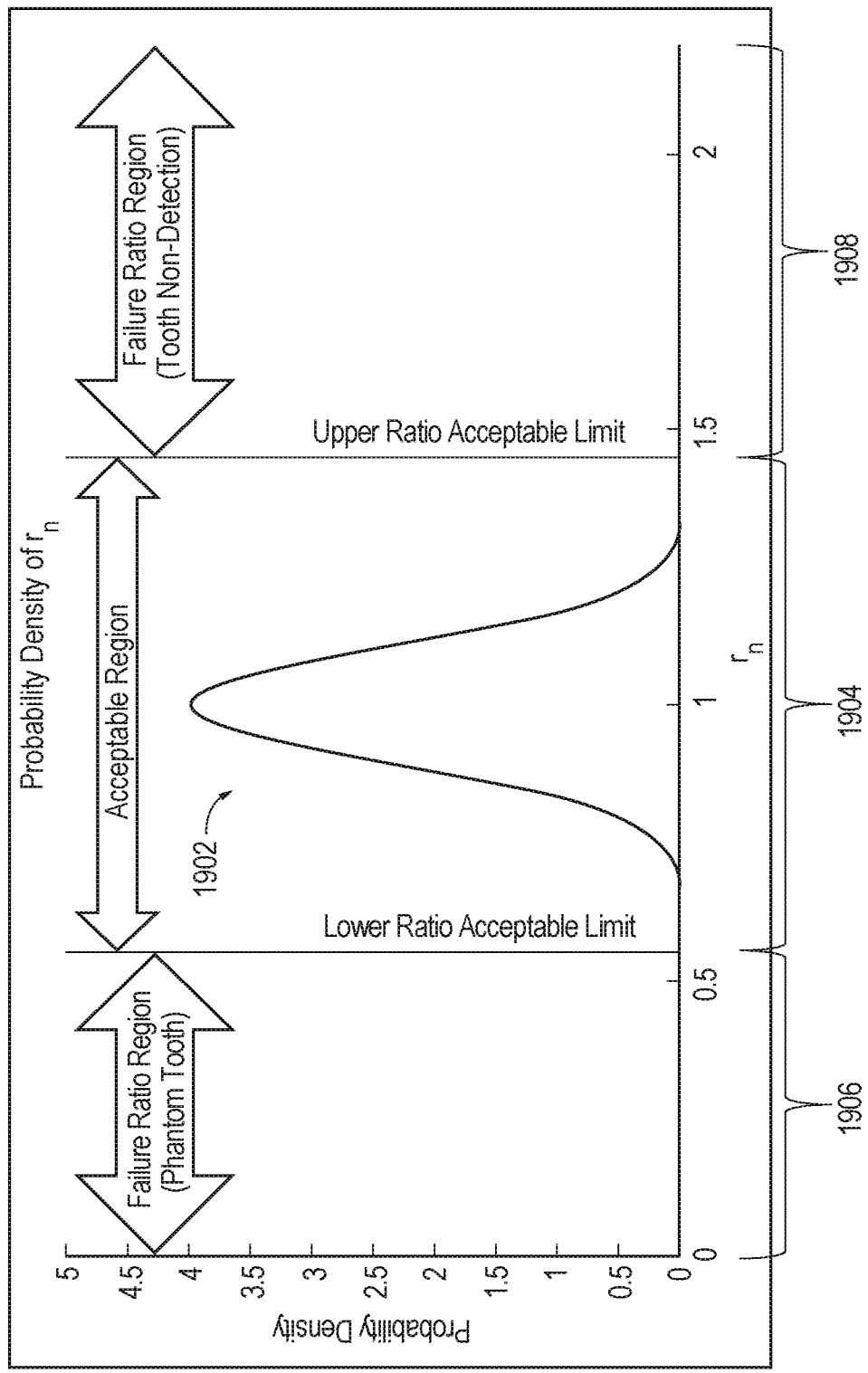
FIG. 19 is an example timing graph corresponding to timing-based error detection according to one or more embodiments.

FIG. 19 is an example probability density graph corresponding to timing-based error detection according to one or more embodiments. For example, the expected ratio curve 1902 may correspond to the probability density of values that the error module predicts for the ratio values based on what is known about the crank pulse wheel 202. In particular, the ratio is based on the detection timing of a most recent time for the most recent teeth as compared to the timing for the teeth immediately before the most recent teeth, such as $(t_n/t_{n-1})$. In one embodiment, the expected ratio curve 1902 may be based on historically observed pulse ratios for one or more vehicles. In the examples described with respect to the timing diagrams 1700 and 1800, the expected ratio value is clustered about one based on the teeth of the crank pulse wheel being evenly spaced. Ratios with a value of approximately one are in an acceptable region 1904 of the expected ratio curve 1902.

The timing scenarios, spacing, and values for the ratios are given to clarify the examples. However, these parameters among others may be altered in different embodiments. For example, the spacing of the teeth on the crank pulse wheel 202 may not be even. Instead, a look up table may be used to identify the expected time for identifying tooth type between adjacent teeth. In this manner, the error module 132 may use what is known about the crank pulse wheel, a crank tooth map, etc. to determine the expected ratio curve 1902 based on a discrepancy in the timing of tooth type identification.

Likewise, anomalous ratios may be clustered together based on the type of error that caused the anomalous ratio. For example, small anomalous ratios are on the end of an expected ratio curve 1902 in a first failure ratio region 1906. Ratios in the first failure ratio region indicate that a phantom tooth 1808 was detected. As discussed above with respect to timing diagram 1800 of FIG. 18, the phantom tooth resulted in a ratio that was half as large as expected.

Large anomalous ratios are on the end of an expected ratio curve 1902 in a second failure ratio region 1908 may indicate that a tooth was not detected. As discussed above with respect to timing diagram 1700 of FIG. 17, the undetected tooth resulted in a ratio that was twice as large as expected.

Figure 20:
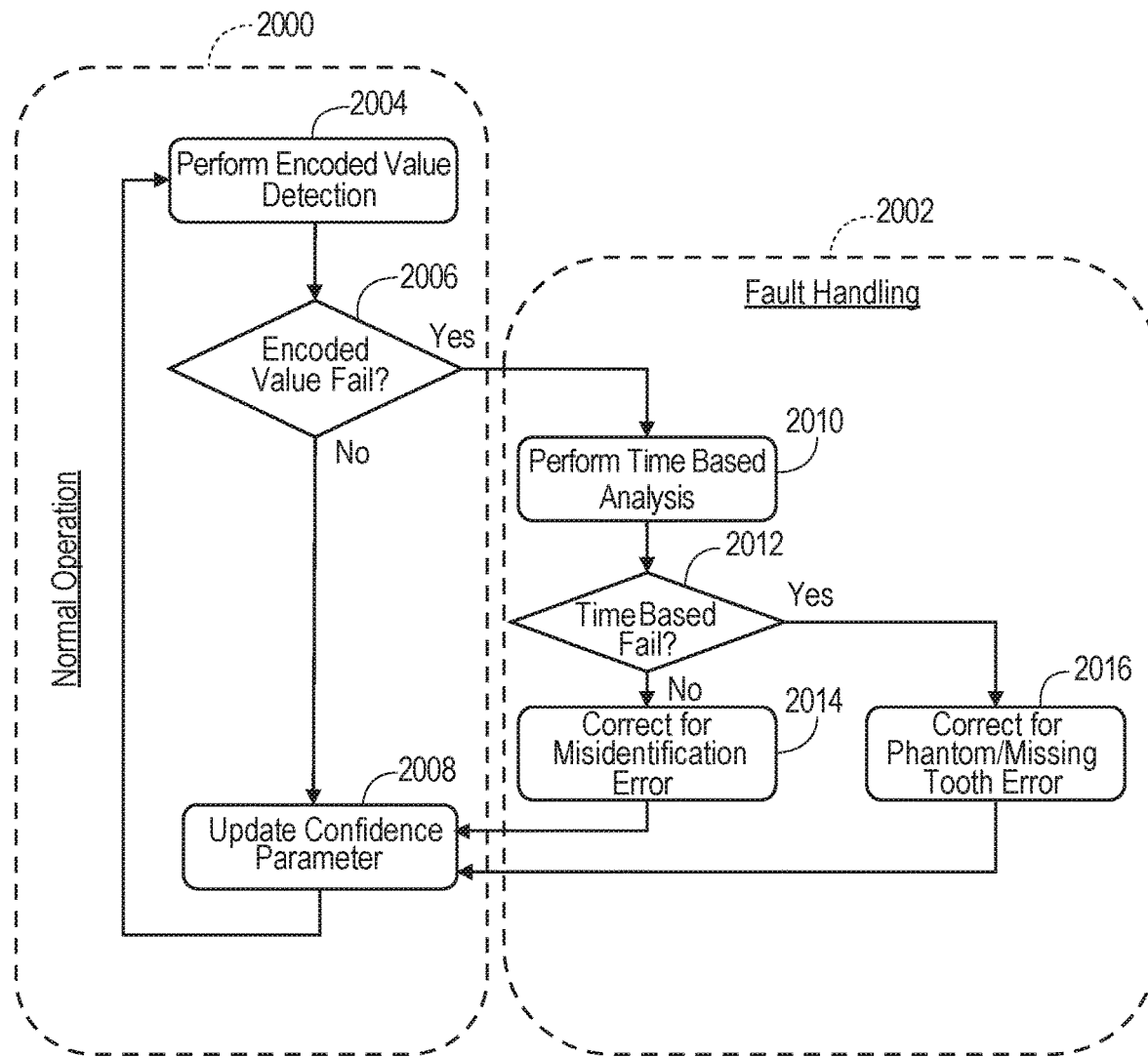
FIG. 20 is an example flow diagram of another method for identification error detection according to one or more embodiments

FIG. 20 is an example flow diagram of a method for identification error detection according to one or more embodiments. During normal operation 2000 an angular position is determined for the crank pulse wheel based on a buffer value, as described, for example, with respect to FIG. 3. However, in the event of an error, the systems and methods pivot to fault handling 2002.

At block 2004, the error module 132 performs encoded value error detection as described in detail with respect to FIG. 15. At block 2006, it is determined whether an encoded value fail has occurred. The encoded value fail indicates that an error has occurred. In particular, the encoded value error detection is able to detect multiple types of errors including a tooth misidentification error, a tooth non-detection error, and a phantom tooth detection error.

At block 2008 a confidence parameter is updated. As discussed above, parameters can be corrected and overwritten when there is confidence in the previously determined angular position based on the previous buffer values. The confidence parameter is indicative of this confidence in previously determined angular positions. For example, the confidence parameter may be based on a set number of buffer values corresponding expected buffer values, crank tooth map, etc. Suppose that the first sliding buffer 502 shown at 330° of the crank tooth map 800 of FIG. 8 is calculated, then the second sliding buffer 602 shown at 0° of the crank tooth map 800 is calculated, and then the third sliding buffer 702 shown at 30° in the crank tooth map 800 is calculated. The results, based on the sliding buffers being calculated, correspond to expected values because the angular position of the crank pulse wheel 202 is moving ahead in line with angular resolution. The more that the calculated buffer values comport with expected buffer values based on predetermined values, the crank tooth map 800, etc., the higher the confidence parameter will be. Therefore, if at block 2006 it is determined that there has not been an error, the confidence parameter is updated at block 2008 to increase the value of the confidence parameter.

Conversely, if it is determined at block 2006 that an error has occurred, the method continues to fault handling 2002. During fault handling, it can be determined which kind of error occurred by performing time-based error detection at block 2010. As described above, time-based error detection can differentiate between non-detection errors and phantom tooth detection errors. However, time-based error detection may be resource intensive. Here time-based error detection is reserved for fault handling, once it has become clear that an error has occurred.

At block 2012, it is determined whether the encoded value failure is a time-based failure such that a non-detection error can be differentiated from a phantom tooth detection error. Continuing the example from above, the calculated pulse ratio may then be compared to an expected ratio value. If the calculated pulse ratio is within a range of the expected ratio value defined, for example, by the expected ratio values 1902, then the error is not considered a time-based failure. And the fault handling 2002 moves to block 2014.

At block 2014, the error is deemed to be a misidentification error and is corrected accordingly. For example, as described above, a tooth type of the buffer value may be modified or overwritten. Once the error is handled, normal operation 2000 is resumed. In particular, the confidence parameter may be updated, at block 2008, based on modification made to the buffer value. For example, the confidence parameter may be reset to a null setting such that confidence has to be rebuilt in the manner described above in response to an error. The confidence parameter may be to take corrective action, for the confidence parameter can be used to help determine what failsafe action should be taken.

If, at block 2012, the error is deemed to be a time-based fail, then the error is corrected based on the type of error that occurred at block 2016. Continuing the example from above, the large anomalous ratios 1904 may indicate that a tooth was not detected, while small anomalous ratios 1906 may indicate that a phantom tooth 1808 was detected. If the tooth was not detected, the buffer value may be revised, for example, with an expected value. Conversely, if it is determined that a phantom tooth was detected, then the corresponding tooth type of the phantom tooth may be overwritten and/or disregarded by the read module 114. Again, once the error is handled, normal operation 2000 is resumed. In particular, the confidence parameter may be updated, at block 2008, based on modification made to the buffer value. Therefore, the error detection of FIG. 20, can both detect and differentiate between tooth misidentification, tooth non-detection, and phantom tooth detection without becoming bogged down in resource intensive analysis for each error.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for error detection in crankshaft tooth encoding for a crank pulse wheel of a vehicle, the system comprising:
 a read module configured to identify a tooth type for N number of teeth in a sliding buffer based on at least one tooth characteristic, wherein N is a positive integer less than a total number of teeth of the crank pulse wheel;
 a buffer module configured to calculate a buffer value for the sliding buffer corresponding to a collection of teeth represented in the sliding buffer;
 an error module configured to detect an error associated with a tooth of the crank pulse wheel and calculate a revised buffer value based on the error; and
 a position module configured to determine an angular position of the crank pulse wheel based on the revised buffer value and broadcast the angular position to one or more vehicle systems of the vehicle.

2. The system for error detection in crankshaft tooth encoding of claim 1, wherein the error module performs encoded value error detection to detect an error and time-based error detection to detect non-detection errors and phantom tooth detection errors, and wherein the error module detects a tooth misidentification error when the encoded value error detection indicates an error and the time-based error detection does not indicate a non-detection error or a phantom tooth detection error.

3. The system for error detection in crankshaft tooth encoding of claim 1, wherein the error module is configured to compare an expected buffer value to the calculated buffer value to detect the error.

4. The system for error detection in crankshaft tooth encoding of claim 1, wherein the error module is configured to compare an expected tooth type to the identified tooth type for the tooth to detect the error.

5. The system for error detection in crankshaft tooth encoding of claim 4, wherein the expected tooth type is determined based on a crank tooth map.

6. The system for error detection in crankshaft tooth encoding of claim 1, wherein the revised buffer value is calculated by modifying the calculated buffer value.

7. The system for error detection in crankshaft tooth encoding of claim 1, wherein the error module detects a phantom tooth detection error when a number of sliding buffers calculated since the error occurred exceeds a number of characteristic values in a chain of identical consecutives characteristic values.

8. The system for error detection in crankshaft tooth encoding of claim 1, wherein the error module is configured to differentiate between a phantom tooth detection error and a non-detection error based on pulse ratios of adjacent teeth.

9. The system for error detection in crankshaft tooth encoding of claim 8, wherein the error module detects a non-detection error in response to detecting a large anomalous ratio as compared to an expected ratio value.

10. The system for error detection in crankshaft tooth encoding of claim 8, wherein the error module detects a phantom tooth detection error in response to detecting a small anomalous ratio as compared to an expected ratio value.

11. A method for error detection in crankshaft tooth encoding for a crank pulse wheel of a vehicle, the method comprising:
 identifying a tooth type for N number of teeth in a sliding buffer based on at least one tooth characteristic, wherein N is a positive integer less than a total number of teeth of the crank pulse wheel;
 calculating a buffer value for the sliding buffer corresponding to a collection of teeth represented in the sliding buffer;
 detect an error associated with a tooth of the crank pulse wheel;
 calculate a revised buffer value based on the error;
 determining an angular position of the crank pulse wheel based on the revised buffer value; and broadcasting the angular position to one or more vehicle systems of the vehicle.

12. The method for error detection in crankshaft tooth encoding of claim 11, wherein detecting the error further comprises:
   performing encoded value error detection to detect a tooth misidentification error; and
   performing time-based error detection to detect a non-detection error and a phantom tooth detection error.

13. The method for error detection in crankshaft tooth encoding of claim 11, wherein detecting the error further comprises comparing an expected tooth type to the identified tooth type for the tooth.

14. The method for error detection in crankshaft tooth encoding of claim 11, wherein detecting the error further comprises:
   calculating a pulse ratio between adjacent teeth of the N number of teeth in the sliding buffer;
   comparing the calculated pulse ratio to an expected ratio value; and
   determining that the error is a missing tooth detection error when the calculated pulse ratio exceeds the expected ratio value by a ratio threshold and that the error is a phantom tooth error when the calculated pulse ratio is below the expected ratio value by the ratio threshold.

15. A non-transitory computer-readable storage medium storing instructions that, when executed by a computer, causes the computer to perform a method for error detection in crankshaft tooth encoding comprising:
   identifying a tooth type for N number of teeth in a sliding buffer based on at least one tooth characteristic, wherein N is a positive integer less than a total number of teeth of a crank pulse wheel;
   calculating a buffer value for the sliding buffer corresponding to a collection of teeth represented in the sliding buffer;
   detecting an error associated with a tooth of the crank pulse wheel;
   calculating a revised buffer value based on the error;
   updating a confidence parameter based on the revised buffer value;
   determining an angular position of the crank pulse wheel based on the revised buffer value; and
   broadcasting the angular position to one or more vehicle systems of a vehicle.

16. The non-transitory computer-readable storage medium of claim 15, wherein confidence parameter is indicative of this confidence in previously determined angular positions, and wherein the confidence parameter is proportional a number of calculated buffer values that comport with expected buffer values.

17. The non-transitory computer-readable storage medium of claim 15, wherein detecting an error further comprises:
   calculating a pulse ratio between adjacent teeth of the N number of teeth in the sliding buffer;
   comparing the calculated pulse ratio to an expected ratio value; and
   determining that the error is a time-based error when the calculated pulse ratio is not within a range of the expected ratio value.

18. The non-transitory computer-readable storage medium of claim 17, wherein the expected ratio value is defined by historically observed expected ratio values.

19. The non-transitory computer-readable storage medium of claim 17, wherein detecting the error further comprises:
   performing encoded value error detection to detect a tooth misidentification error; and
   performing time-based error detection to detect non-detection errors and phantom tooth detection errors.

20. The non-transitory computer-readable storage medium of claim 15, wherein detecting the error further comprises comparing an expected tooth type to the identified tooth type for the tooth.

* * * * *